(12) United States Patent
Hill

(10) Patent No.: US 9,953,486 B2
(45) Date of Patent: Apr. 24, 2018

(54) BIOMETRIC GAMEPLAY VERIFICATION

(71) Applicant: Otho Dale Hill, Henderson, NV (US)

(72) Inventor: Otho Dale Hill, Henderson, NV (US)

( * ) Notice: Subject to any disclaimer, the term of this patent is extended or adjusted under 35 U.S.C. 154(b) by 0 days.

(21) Appl. No.: 15/459,337

(22) Filed: Mar. 15, 2017

(65) Prior Publication Data
US 2017/0337769 A1    Nov. 23, 2017

Related U.S. Application Data

(63) Continuation of application No. 15/160,454, filed on May 20, 2016, now Pat. No. 9,619,965.

(51) Int. Cl.
*A63F 13/00* (2014.01)
*G07F 17/32* (2006.01)
*A63F 13/52* (2014.01)

(52) U.S. Cl.
CPC .......... *G07F 17/3241* (2013.01); *A63F 13/52* (2014.09); *G07F 17/3209* (2013.01); *G07F 17/3211* (2013.01)

(58) Field of Classification Search
None
See application file for complete search history.

(56) References Cited

U.S. PATENT DOCUMENTS

| | | | |
|---|---|---|---|
| 6,142,876 | A | 11/2000 | Cumbers |
| 7,175,528 | B1 | 2/2007 | Cumbers |
| 2002/0082082 | A1 | 6/2002 | Stamper et al. |
| 2002/0142844 | A1 | 10/2002 | Kerr |
| 2004/0015423 | A1 | 1/2004 | Walker |
| 2004/0192442 | A1* | 9/2004 | Wells ................. G07C 9/00158 463/36 |
| 2006/0177109 | A1 | 8/2006 | Storch |
| 2007/0094721 | A1 | 4/2007 | Nguyen |
| 2008/0113785 | A1 | 5/2008 | Alderucci |

(Continued)

FOREIGN PATENT DOCUMENTS

| | | |
|---|---|---|
| CN | 102 354 409 | 2/2012 |
| EP | 2 308 575 A1 | 4/2011 |

OTHER PUBLICATIONS

International Search Report for International Application No. PCT/US2017/028430 dated Jun. 1, 2017.

(Continued)

*Primary Examiner* — Jason Yen

(57) ABSTRACT

Systems and methods for controlling access to online casino games are described herein. In one aspect, an authoritative image of a remote player is received and stored in a biometrical facial recognition database. The authoritative image can be linked with a player profile of a player tracking card holder. To play an online casino game, the remote player can provide an authentication image. The player's presence in the authentication image can be determined using a biometrical facial recognition software application. Upon successful authentication, a selection of online casino games can be displayed to the remote player. The real-time (e.g., during game play) identity of the remote player can be determined. If an authorized remote player has been replaced by an unauthorized remote player, the game play can be terminated. In another aspect, the remote player provides the authoritative image after receiving an invitation.

18 Claims, 8 Drawing Sheets

(56) References Cited

U.S. PATENT DOCUMENTS

| | | |
|---|---|---|
| 2008/0214261 A1 | 9/2008 | Alderucci |
| 2009/0098925 A1* | 4/2009 | Gagner .................. G07F 17/32 |
| | | 463/20 |
| 2009/0275407 A1 | 11/2009 | Singh |
| 2010/0178986 A1 | 7/2010 | Davis |
| 2012/0129596 A1 | 5/2012 | Thackston |
| 2012/0258795 A1* | 10/2012 | Ryan .................. G07F 17/3206 |
| | | 463/29 |
| 2013/0137516 A1* | 5/2013 | Griswold ............ G07F 17/3206 |
| | | 463/36 |
| 2013/0254874 A1 | 9/2013 | Xu |
| 2013/0283057 A1* | 10/2013 | Hama ................ G06K 9/00885 |
| | | 713/186 |
| 2014/0114738 A1* | 4/2014 | Tseng ................ G06Q 30/0241 |
| | | 705/14.27 |
| 2014/0196152 A1 | 7/2014 | Ur |
| 2014/0196156 A1* | 7/2014 | Lection ............... G06F 21/6209 |
| | | 726/28 |
| 2014/0323192 A1 | 10/2014 | Keilwert |
| 2015/0087371 A1 | 3/2015 | Hill |
| 2015/0124053 A1* | 5/2015 | Tamura ............. G06K 9/00228 |
| | | 348/46 |
| 2015/0178579 A1* | 6/2015 | Shin .................. G06K 9/00892 |
| | | 348/77 |

OTHER PUBLICATIONS

Zhao et al. "Face Recognition: A Literature Survey," Technical Report CAR-TR-948, Center for Automation Research, University of Maryland (2000).

Kieseberg et al. "QR Code Security," TwUC'10, Paris, France (Nov. 8, 2010).

* cited by examiner

BIOMETRIC GAMEPLAY VERIFICATION

CROSS-REFERENCE TO RELATED APPLICATIONS

This application is a continuation of U.S. patent application Ser. No. 15/160,454 filed on May 20, 2016 entitled "BIOMETRIC GAMEPLAY VERIFICATION," the disclosures of which is hereby incorporated by reference in its entirety. Furthermore, any and all priority claims identified in the Application Data Sheet, or any correction thereto, are hereby incorporated by reference under 37 C.F.R. § 1.57.

BACKGROUND

Field

The present application relates generally to gaming systems, and more specifically to systems and methods for controlling access to online games.

Description of the Related Art

A land-based casino operator (LBCO) can operate a player tracking card system (PTCS) for creating player tracking cards (PTCs) for its players. A player may have to provide a pin number when a PTC is newly issued to the player. The player may have to provide the pin number when accessing his player profile or redeeming his reward points earned by, for example, using the PTC to play casino games at a land-based casino operated by the LBCO. However, an unscrupulous actor may obtain the pin number and pretend to be the remote player, for example, during a play of an online casino game.

SUMMARY

Accordingly, the systems and methods described herein, based on image authentication or other forms of biometric authentication, can be used by operators such as land-based casino operators (LBCOs), online casino operators (OCOs), or LBCOs/OCOs to authenticate or verify the identities of remote players in real time or to control access of remote players to online games.

In one innovative aspect, a method for controlling access to online games is provided. The method includes receiving a first image; and associating the first image with a player profile of the remote player, the player profile stored in a player data store. The method also includes receiving a second image from a gaming device; and comparing pixel information in the first image and the second image to determine whether the remote player is present in the second image. The method further includes causing display of graphical indicia of online games available for play via the gaming device based on the player profile of the remote player.

In another innovative aspect, a system for controlling access to online games is disclosed. The system includes a biometric detector configured to capture biometric information for authenticating a remote player; and a game interface configured to display graphical indicia of online games available for play by the remote player. The system also includes a biometric data storage database configured to store biometric information of the remote player and biometric information of players prohibited from playing; a game storage database configured to store the online games. The system further includes a microprocessor controlled device, for example a gaming device, configured to: receive permissions for the remote player, the permissions granting or denying access to the biometric detector for capture of the biometric information; identify a set of online games available for play from the game storage database based at least in part on: the permissions, and a comparison of biometric information for the remote player with biometric information of the players prohibited from playing; and display graphical indicia of the set of online games available for play by the remote player.

The systems and methods described each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features described provide advantages that include authentication of players interacting with an online system or service such as a casino gaming system, age restricted content systems (e.g., adult content, alcohol, fire arms, etc.), or other systems or services with identity based access restrictions.

DETAILED DESCRIPTION

Figure 1:
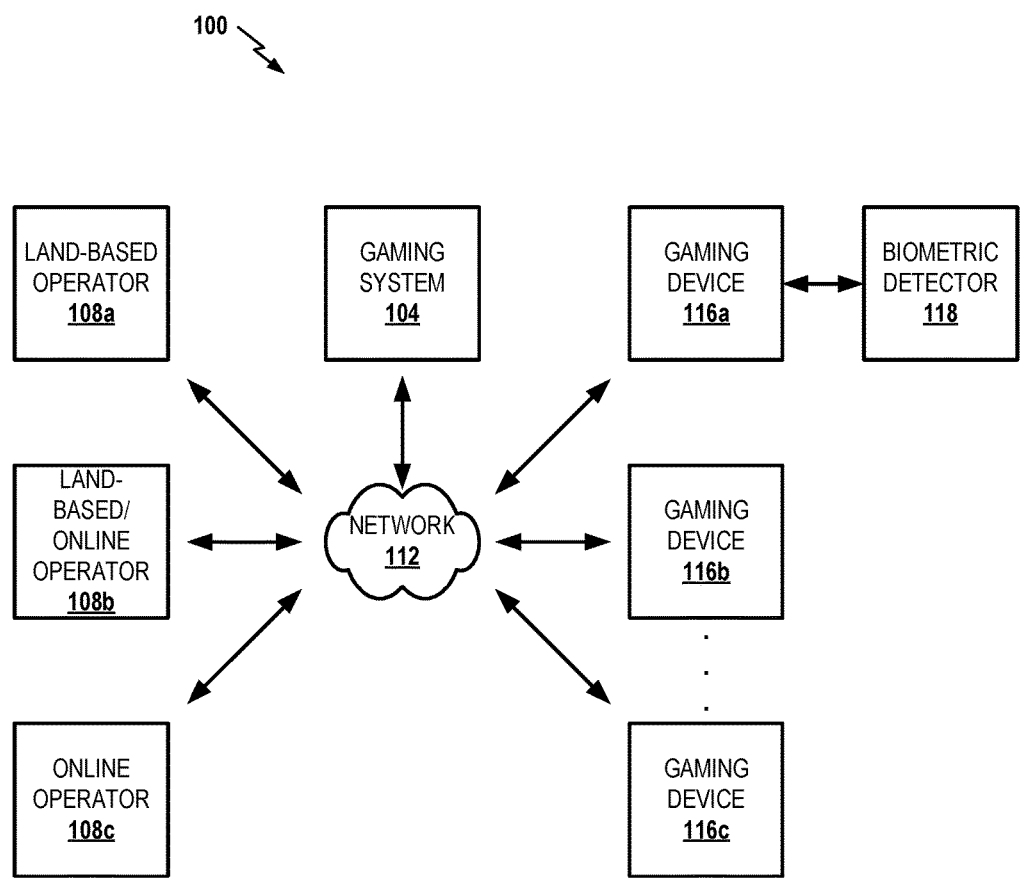
FIG. 1 shows a functional block diagram of an exemplary system for controlling access to online games.

The word "exemplary" is used herein to mean "serving as an example, instance, or illustration." Any aspect or embodiment described herein as "exemplary" is not necessarily to be construed as preferred or advantageous over other aspects or embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect described. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosures set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the preferred aspects. The detailed description and drawings are merely illustrative implementations of certain features, with the scope of the disclosure being defined by the appended claims and equivalents thereof.

Although the description below focuses on gaming systems, in particular casino gaming, the identity verification features described may be implemented to provide authentication of users interacting with a variety of online systems or services where it may be desirable to implement identity based access restrictions. In some implementations, the identity verification features described may be implemented to provide authentication of players playing casino games on the premises of a land-based casino. In some implementations, the identity verification features described may be implemented to provide authentication of players who make cash wagers on the outcome of one or more sporting events, other public events, or electronic-games (e-game) offered by one or more LBCOs or OCOs sportsbook(s), associated with an online gaming website, to their remote players for wagering online.

An electronic game can be a game that employs electronics to create an interactive system with which a player can play. Electronic-games can be played on a microchip-controlled device, for example a special gaming console other than a personal computer. Electronic-games may be played using an input interface, for example a joystick, to manipulate or move figures or graphical symbols on a video display screen of the special gaming console. Electronic-games can include electronic games that require players to interact with a user terminal interface to generate visual feedback on a display device such as a video screen or television as in a toy or an arcade machine. Video Electronic games can typically provide interactivity and information to players via audio devices, for example sound reproduction devices such as speakers and headphones. Electronic-games can include virtual reality, a hypothetical three-dimensional visual world created by a computer where players use input/output devices such as special goggles or fiber optic gloves, and can enter and move about in this world and interact with objects as if inside it.

Gaming systems for playing e-games include Sony's PlayStation 3 and 4 (PS3 and PS4), Microsoft's Xbox (Xbox One, XBox Live, and Xbox 360) and Wii. Electronic games can be played using these gaming system and personal computers via online gaming platforms such as Steam. An online gaming platform can include a digital distribution platform offering digital rights management (DRM), multiplayer gaming and social networking. An online gaming platform can deliver a range of games to a computer's desktop. The online gaming platform can provide players with automatic updates, lists of games and prices, posters, and access to a large gaming community. Some or all of the features described may be included in an online gaming platform to allow biometric gameplay verification.

Player Tracking Card System and Database

A land-based casino operator ("LBCO"), for example a legally license LBCO, can operate a player rewards center (PRC) at a land-based casino (LBC) operated by the LBCO for managing players of the LBCO. The player rewards center can be located within close proximity of slot machines or casino table games of the LBC. A service assistant working at the player rewards center can operate a player tracking card system (PTCS) for creating player tracking cards (PTCs) for players at the LBC.

The LBCO can issue player tracking cards to qualified players. A qualified player may be a player who can legally play the games at the LBC (e.g., the player may have to be 21 years of age or older). A qualified player can wager on one or more types of slot machines, casino table games, e-games, or sportsbooks located on the LBC's premise. To show that he can legally play the games at the LBCO, the qualified player may submit a government issued photograph identification (ID) or documentation (e.g., a state issued driver's license, or a passport), to the service assistant. The photograph identification can include information such as the player's name, social security number, date of birth (DOB), gender, address, or country of residence.

After verifying the validity of the photograph identification and that the player can legally gamble at the LBC, a player profile can be created for the player. An electronic player tracking card database (PTCD) can be configured to store the player profile. The player profile can contain the player's information, and the player's information can be inputted into the player tracking card system (PTCS). For example, the service assistant can manually input the player's information into the PTCS. As another example, the PTCS can be coupled with an electronic scanner configured for scanning the player's photograph identification. From the scanned photograph identification of the player, the PTCS can extract the player's information using an optical character recognition (OCR) method. The PTCD may be directly connected to the PTC, or the PTCS can communicate with the PTCD by wireless or wireless communications.

After the player's information is inputted into the PTCS, a player tracking card reader (PTCR), for example a magnetic strip reader, connected with the PTCS can create a player tracking card for the player. The player may have to provide a pin number for the newly issued PTC. For example, the player can input a pin number using an electronic keypad coupled to the PTCS. The pin number can be stored in the PTCD. The pin number is a numeric code that the player selects to secure access their player tracking card.

The player may have to provide the pin number when accessing his player profile or redeeming his rewards points earned by, for example, using the PTC to play casino games at the LBC. For example, to review the reward points he has earned, he can insert his PTC into a PTCR connected to a slot machine or other gaming device and input his pin number. The slot machine or other gaming device may be connected to a network. Via this network, the slot machine or other gaming device may be configured to retrieve the player's player profile from the PTCD.

The player tracking card may provide a cost effective method for the LBCO to track and record the gaming activities of players. From the record of gaming activities of the player, the LBCO can calculate the player's earning potential. For example, a player can earn reward points for playing a slot machine if he inserts his PTC prior to, during, or subsequent to, playing at the slot machine. The slot machine can provide the PTCS with the player's playing activities for storage in the PTCD. The PTCS can record data specific to the player's play of that particular slot machine. For example, the PTCS can record slot machine number, time in, time out, duration of play, coin in, coin out, win, or loss.

The PTCS can use the player's playing activity to calculate the player's complimentary value or true worth to the LBCO. The PTCS can calculate the player's rewards points based on the player's complimentary value or true worth value. For example, a PTCH can earn points for each gaming session. The player can use his reward points to book or purchase room, food, beverage, or anything of value that the LBCO makes available to the player.

The name of the player and the PTC number may be printed on the PTC, while a photograph of the player may not be. The LBCO's contact information or an age specific warning may be printed on the PTC. The age specific warning may state "Cardholder must be at least 21 years old and by use of this card agrees to all terms and conditions now or hereafter applying to the card and its use. The card is non-transferable, the property of the LBCO, and must be surrendered on request."

A regulator of the LBCO, for example the State of Nevada's Gaming Control Board, can approve and enforce the verification process that the LBCO uses to insure that a PTC is only issued to a player who can legally play at the LBCO (for example, the player must be 21 years of age or older). Because of the strict procedure employed by the LBCO to verify, prior to issuing a PTC to a player, it may be advantageous for a LBCO to charge an online casino operator (OCO) or a social media website associated with an OCO for accessing the PTCS or the PTCD. The online casino operator can offer online games, for example online free play games, online fee-based games such as fee-based online casino tournament games, online cash play games, and/or wagering on sporting events and e-games, through its online sportsbook, to PTCHs. A PTCH playing online games remotely, for example at his home and not on the premises of a land-based casino, can be a remote player. A remote player may access an online casino website operated by an OCO located in a gaming jurisdiction or country wherein online casino gambling is legal. A LBCO legally licensed to operate an online casino website can be a LBCO/OCO.

System for Controlling Access to Online Games

FIG. 1 shows a functional block diagram of an exemplary system 100 for controlling access to online games. This diagram shows a configuration for one gaming system 104. However, a plurality of gaming systems 104 may be available for controlling access to online games. It will be understood that the processes and systems described may be configured to support two or more gaming systems 104 of the same or different types.

Operators, for example a land-based operator 108a, a land-based/online operator 108b, or an online operator 108c can utilize the gaming system 104 via a network 112 to control access to online games by remote players. Two or more operators can share the gaming system 104, or two operators can each operate or maintain their own gaming systems 104. Remote players can use their microprocessor controlled devices, for example gaming devices such as a gaming device 116a, a gaming device 116b, or a gaming device 116c, to access online games offered by the operators via the network 112. A gaming device may be implemented as a physical gaming machine installed at an operator's facility. Examples of such gaming devices include slot machines, video card game machines (e.g., poker, keno, blackjack, etc.), bingo machines, or off-track-betting consoles. Other examples of such gaming devices include stadium gaming terminals, with keyboards, located within a LBCO to accommodate players who may not wish to play at a standard casino game table, (i.e. a baccarat table). A gaming device may be implemented as a physical gaming machine owned by or under control of the player. For example, the gaming device may be an electronic communication device configured to communicate with the land-based/online operator 108b or the online operator 108c. Examples of electronic communication devices include an appliance, a video conferencing system, personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. In some implementations, the network 112 can be a cloud, a virtual network hosted over many different redundant servers and databases not always located in the same facility, as opposed to a traditional network hosted with in a singular brick and mortar facility.

A gaming device may transmit messages to and receive messages from an operator (e.g., 108a, 108b, 108c) and/or gaming system 104. The messages may be formatted according to a standardized protocol such as TCP/IP, HTTP, SSL, FTP, or the like. The transmission may be sent wired, wireless, or hybrid wired-wireless networks (e.g., the network 112). The network 112 may include an interconnection of one or more networks such as the Internet, a local area network, a wide area network, a peer-to-peer network, a cellular network, a satellite network, a public switched telephone network, any combination thereof, or other communication system for exchanging data between electronic devices.

A gaming device, for example the gaming device 116a can be coupled to a biometric detector 118. The biometric detector 118 can be configured to capture biometric information for authenticating a remote player. The biometric detector 118 can be an imaging device such as a digital camera or a webcam configured to capture image data for authenticating a remote player. A remote player can be a player tracking card holder (PTCH), a player with an existing player tracking card (PTC); and his player tracking card number can be inputted into a gaming device. The gaming device 116a can display the games available for play by the remote player. The gaming device 116a can download and execute a biometric facial recognition software application (BFRSA) configured for biometric authentication during log in or confirmation of the remote player's identity. The identity confirmation, associated with the player rating history (PRH) of a remote player's PTC, may be performed to determine which games are available to the player. The identity confirmation may be performed while playing a game such as to confirm the identity of a player during a real-time online poker tournament. The gaming device 116a may be in communication with a video teleconferencing (VTC) network so that the remote player can participate in live online games, such as live online casino games. An example VTC network that enables the remote player to participate in live online games is described in U.S. patent application Ser. No. 14/495,731, the entirety of which is hereby incorporated by reference.

Other examples of biometric information that can be captured by the biometric detector 118 include fingerprints, vein prints, palm prints, hand geometry, dour/scent, iris patterns, retina patterns, or voice prints. In some implementations, the biometric detector 118 may be provided by an operator. In such implementations, the biometric detector 118 may include additional hardware security features to prevent remote players from providing false identity information. Such security features may include an encryption key stored in a secure memory location and used for communicating data with the gaming system 104. In some implementations, the features may include a token generation circuitry for generating two-factor authentication information to communicate with the gaming system 104 such as features similar to the RSA SecurID (e.g., hardware tokens) commercially available from RSA Security.

The land-based operator 108a can be a land-based casino operator (LBCO). The land-based/online operator 108b can be a LBCO/OCO, an LBCO which operates one or more online casino websites. The online operator 108c can be an online casino operator. An operator can utilize the gaming system 104 to host an online gaming website, for example an online casino website. In some implementations, an operator can utilize the gaming system 104 to control access to an online gaming website not hosted on the gaming system 104. A LBCO can convert its existing player tracking card system (PTCS) into the gaming system 104 (described further with reference to FIG. 5).

A gaming device can be used by multiple remote players to play an online game, and a remote player can use two or more gaming devices to play an online game. For example, a first remote player can use the gaming device 116a or the gaming device 116b to play an online game hosted by the online operator 108c. The gaming device 116c can be used by a second remote player and a third remote player to play an online game hosted by the land-based/online operator 108b.

Computer System for Controlling Access to Online Games

Figure 2:
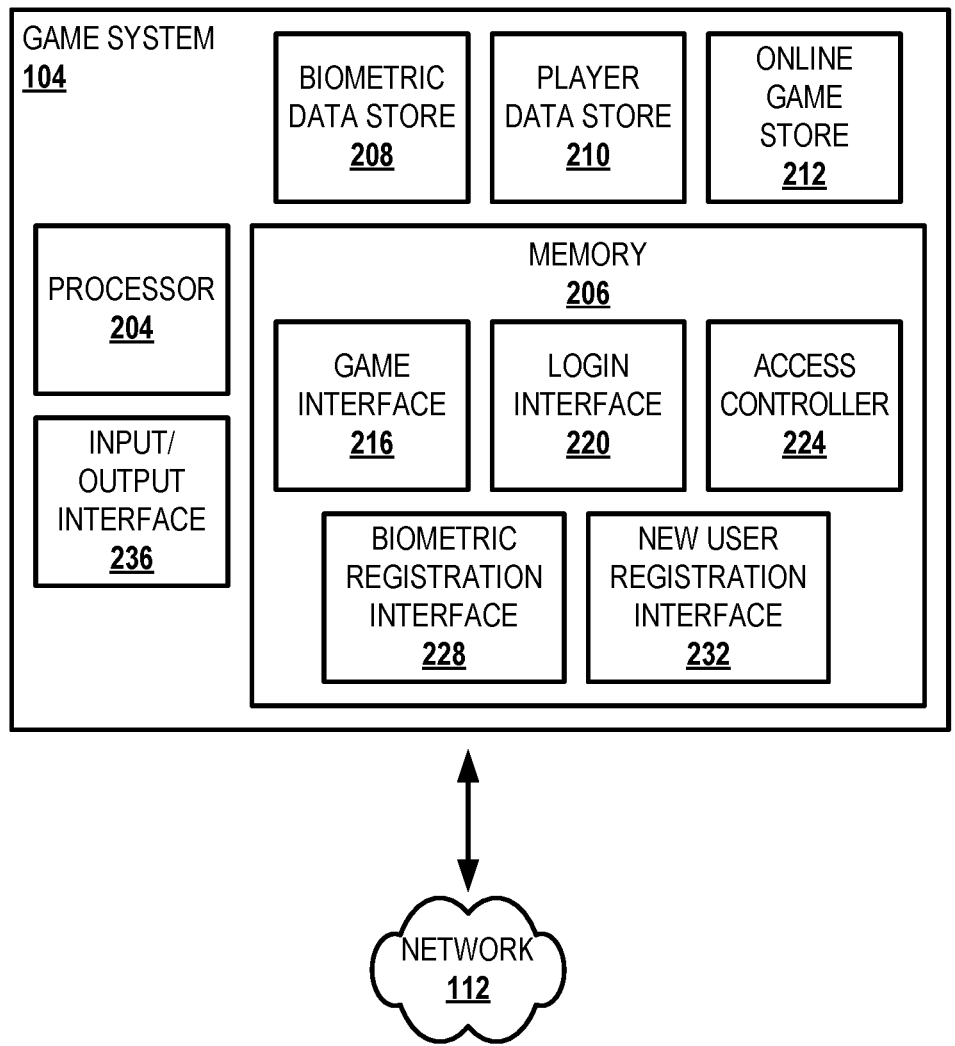
FIG. 2 shows a functional block diagram of a computer system for controlling access to online games shown in FIG. 1.

FIG. 2 shows a functional block diagram of a computer system for controlling access to online games shown in FIG. 1. The gaming system 104 can include a processor 204 coupled to a memory 206. The memory 206 may include RAM, ROM, and/or other persistent, non-transitory computer readable media. The gaming system 104 can include a biometric data store 208, a player data store 210, or an online game store 212. The processor 204 can be configured to execute instructions stored in the memory 206 for implementing a game interface 216, a login interface 220, an access controller 224, a biometric registration interface 228, or a new player registration interface 232 of the gaming system 104. In some implementations, the one or more of the game interface 216, the login interface 220, the access controller 224, the biometric registration interface 228, or the new player registration interface 232 may be implemented as a hardware device (e.g., circuit) configured to perform the functions described. The gaming system 104 can include an input/output interface 236. The processor 204 can communicate output information to an optional display, for example a computer monitor, via the input/output interface 236. The input/output interface 236 can accept input from an optional input device, such as a keyboard, a mouse, a digital pen, a microphone, a storage device, a touch screen, a gamepad, or other input device. One example of an input is a swipe received via a touch screen. Another example of an input is an activation via a mouse click.

One or more components of the gaming system 104, for example the access controller 224, can be part of the gaming system's security system. The gaming system 104 can communicate through the network 112 with the land-based operator 108a, the land-based/online operator 108b, and the online operator 108c. The gaming system 104 can communicate through the network 112 with the gaming device 116a, 116b, or 116c.

The biometric data store 208 can be a computer database configured to store remote players' biometric information such as authenticated biometric information of remote players. Biometric information may include, for example, images of the players' facial images as described with reference to FIG. 3. Where biometric information includes fingerprints, the biometric data store 208 can store one or more images of a remote player's fingerprints. The biometric data store 208 may store the biometric information as an authoritative record for determining the identity of the player. This authoritative record may be used to conduct subsequent identity verifications for the player. In some implementations, it may be desirable for the biometric data store 208 to include additional security features to ensure the biometric information for a player is not altered. Such features may include encryption of the biometric information stored in the biometric data store 208, electronic signing and/or storage of signatures for the biometric information stored in the biometric data store 208, and the like. The one or more images or fingerprints of the remote player can be accessed from the biometric data store 208 and compared with an authentication image or an authentication fingerprint provided by remote player for image-based authentication or when logging into an online gaming website operated by an operator.

In some implementations, the biometric data store 208 can be configured to store the biometric information of players prohibited from accessing one or more games offered by the gaming system 104 or an online casino website operated by an online casino operator (OCO). For example, the biometric data store 208 may store facial images or photographs of game cheats, purse snatchers, or "beards" (e.g., strawmen who make many small wagers for individuals who want to make large wagers on a sporting event; but he doesn't want to risk having an impact on the line. If he makes a large wager himself a legal sportsbook might move the line, so he may give several "beards" money to bet on the event; and if he wins his "beards" get a small percentage of his winnings.) Facial images or photograph's of all game cheats, beards, fugitives, or problem gamblers can be imported into the biometric data store 208 for comparison with facial images captured by a webcam of the remote player's gaming device. Accordingly, the biometric data store 208 can be a biometric facial recognition database (BFRD), and the gaming system 104 can be a biometric facial recognition system. When the gaming system 104 is presented with an image of a player (e.g., during login or game play), the image may be compared to the prohibited players' biometric information. If the comparison indicates a match, the player may be prohibited from further play or be presented with a limited set of games for play, for example free play games. In some implementations, the gaming system 104 may provide a message including the determination to an operator, for example the online operator 108c. In such implementations, the operator's system may then adjust game play or interfaces presented therefrom based on the determination.

The player data store 210 can be a database configured to store player profiles of remote players and player tracking card holders (PTCHs). For example, the gaming system 104 can retrieve player profiles stored in a player tracking card database (PTCD) of a player tracking card system (PTCS) for storage in the player data store 210. A player profile stored can include, for example, a remote player's name, date of birth (DOB), social security number, passport and/or visa number, gender, address, or country of residence. Other non-limiting examples of the information in the player profile include the remote player's "player rating history" such as suspicious activity by the remote player (e.g., game play behaviors); the remote player's skill level, such as recreational or highly skilled; the number, frequency, or length of remote player's playing sessions; minimum, maximum or average bets; win and loss per session; credit line; or whether the remote player is a problem gambler. For example, the gaming system 104 can implement one or more card counting detection systems. Players who count cards typically exhibit a regular game play pattern (e.g., betting, in game decisions, etc.). These patterns may be used by a card counting detection system to identify players employing such strategies. Using tracked game play behavior, the gaming system 104 can determine the strategy and betting proficiency of a remote player. A card counting detection system may be configured to compare the strategy and/or betting proficiency with one or more card count systems to determine whether or not the remote player's skill level is that of a recreational player, or a remote player with a skill level high enough to overcome the host OCO's house advantage. A player's skill level in poker or blackjack may be determined to within about 97% accuracy based on analysis of the player's historical game play decisions. The game play decisions may be provided via a gaming device. The player data store 210 can contain millions of player profiles of existing player tracking card holders (PTCHs). The player profiles stored in the player data store 210 can be shared with other online operators 108c such as online casino operators (OCOs).

The online game store 212 can be a database configured to store games available for play such as including the sensory and game play data of online games, played by real people, that are captured during real-time for live, real-time, delayed or on-demand broadcast to one or more remote players. Games may be assigned to difference classes such as free play games, fee-based online casino games such as fee-based online casino tournament games, online sportsbooks such as online sportsbooks that accept cash wagers, and/or cash wagers from remote players wagering on e-games. Non-limiting examples of online games stored in the online game store 212 include poker, slot games, blackjack, bingo, roulette, or baccarat. The online games can include virtual or live games. A virtual online game can be, for example, a poker game with one or more virtual players under the control of the gaming system 104. A live online game can be, for example, a casino poker game with two or more remote players playing the poker game in real time.

The game interface 216 can be a medium for communicating through the network 112 configured to display, or cause display of, one or more graphical indicia of online games on a remote player's gaming device, for example the gaming device 116a. For example, a graphical indicia of a game can be the name of the game such as baccarat. As another example, a graphical indicia of a game can be an image of a baccarat table. As yet another example, a graphical indicia of a game can be a video of the play of a baccarat game, captured during real-time by the gaming system 104 cameras. The game interface 216 may provide the remote player's gaming device with all of the online games stored in the online game store 212. In some implementations, the game interface 216 may provide the remote player's gaming device with only the online games available for play to the remote player. The availability may be based on the availability and content of biometric information for the player. The remote player may configure the graphical indicia of online games displayed on the remote player's gaming device, such as the look-and-feel of the display or the number of graphical indicia displayed.

The login interface 220 can be a medium for communicating through the network 112. The login interface 220 can be configured to request or accept biometric login information from remote players to enable the remote players to play online games offered on an online gaming website, for example an online casino website. To play an online game, a remote player may provide authentication information to the login interface 220. The authentication information can include biometric information such as an authentication image (e.g., a frontal image of the remote player) or an image of the remote player's fingerprint. The authentication information can include the remote player's name, or the remote player's player tracking card number; and/or his/her PIN number. In some implementations, when converting a LBCO's or a OCO's PTCD without biometric data of the PTCH, the login interface 220 of the gaming system 104 may request and receive the PTCH's name, PTC number, and the PTCH PIN number to authenticate the identity of the remote player whose player profile may be stored within the PTCD.

The access controller 224 can be configured to determine the classes of games a remote player can play. For example, the remote player may be authorized to play only free play games because the player data store 210 may not contain the remote player's banking information or the remote player's account balance may be insufficient for any of the fee-based games or cash play games. As another example, even though the remote player may have sufficient balance in his online account for playing cash play games; and or the remote player may be authorized to play only free play games and fee-based games because he has not granted the gaming system 104 permission to confirm his identity during a game play as described with reference to FIG. 4.

The biometric registration interface 228 can be a medium for communicating through the network 112 configured to receive biometric information from player devices for association or incorporation into existing player profiles. For example, a remote player can be a player tracking card holder. To associate an image of the remote player with his player profile, the biometric registration interface 228 can request and receive a frontal image of the remote player for storage in the biometric data store 208 as described with reference to FIGS. 3 and 5. Accordingly, the biometric registration interface 228 can be used to convert a player tracking card database (PTCD) without any photographs of the player tracking card holders (PTCHs) to a PTCD with photographs of PTCHs. The biometric registration interface 228 can implement, integrate, or utilize one or more biometric facial recognition software applications (BFRSAs). The biometric registration interface 228 may receive biometric information in different formats from each remote player. For example, the biometric registration interface 228 can receive images of remote players in formats such as the Joint Photographic Experts Group (JPEG) format.

The new player registration interface 232 can be a medium for communicating through the network 112 configured to receive a remote player's personal information and biometric information for issuing new player tracking cards with biometric information. The biometric data store 208 can store a remote player's biometric information received by the new player registration interface 232. The player data store 210 can store the remote player's personal information such as the remote player's name, date of birth (DOB), social security number, passport number, gender, address, or country of residence.

The processor 204 may include or be a component of a processing system implemented with one or more processors. The one or more processors may be implemented with any combination of general-purpose microprocessors, microcontrollers, digital signal processors, or any other suitable entities that can perform calculations or other manipulations of information. The processor 204 may be coupled to the memory 206, which may include both read-only memory and random access memory or may provide instructions and data to the processor 204. The processor 204 may be configured to perform logical and arithmetic operations based on program instructions stored within the memory 206. The instructions in the memory 206 may be executable to implement the methods described herein.

The processor 202 may be further configured to communicate with a storage, such as the biometric data store 208, the player data store 210, or the online game store 212. The storage may include various computer components or recording media that retain information. The storage may include a database, cloud data storage service, cluster shared volumes (CSV) arrangement, flat file, or other information storage file or systems. The storage may store information received from the remote players without modification, in a compressed or encoded form, or results of calculations based on the information. The information may also be stored and separated based on how recent the information is.

Although a number of separate components are illustrated in FIGS. 1 and 2, those of skill in the art will recognize that one or more of the components may be combined or commonly implemented. For example, the processor 202 may be used to implement not only the functionality described above with respect to the processor 202, but also to implement the functionality described above with respect to the storage or one or more interfaces. Further, each of the components illustrated in FIG. 2 may be implemented using a plurality of separate elements. Moreover, components or the entirely of the gaming system 104 may be programmed using one or more programming languages such as C-Sharp, Java, Python, or C++, and in some implementations, via a framework such as Microsoft .NET, Tornado from The Tornado Authors, or The Spring Framework from Pivotal Software.

The gaming system 104 can advantageously offer operators such as LBCOs, OCOs, or LBCOs-OCOs, a number of advantages. For example, the gaming system 104, coupled to a computerized point of sale (POS) terminal with player tracking card (PTC) reader, and/or display device, may prevent PTCs from being used for illicit, or unethical, purposes. People attempting to use PTCs for illicit or unethical purposes may be known or unknown to the PTC holders (PTCH) or the operators issuing the PTCs, for example land-based casino operators (LBCO). As another example, the gaming system 104, when coupled to a display device such as a computer monitor, can be used by service personnel or staff members of a LBCO/OCO, operating an online casino website, to visually verify or confirm the identity of a PTCH who visits the LBCO/OCO's website. Such verification or confirmation may occur in real-time and/or during a review of the play of the game by service personnel or gaming regulators.

In some implementations, the gaming system 104 may allow PTCHs to redeem his reward points, for example earned reward points, with businesses or facilities operated by, or affiliated with, the LBCO. For example, PTCHs can use his reward points to redeem selected merchandise, tickets to sporting events, or stage shows. As another example, PTCHs can use his reward points to obtain discount rates for hotel reservations. As yet another example, the gaming system 104 may allow PTCHs to obtain confirmed reservations for any entertainment events when the reservations are in high demand, such as on a New Year's Eve or on during a Super Bowl weekend. The gaming system 104 may prevent people other than PTCHs from redeeming the PTCHs' points or benefits, for example, for free meals.

The systems and methods disclosed herein may be effective in verifying the real-time identity of a remote player during a play of an online game. Prohibited or fraudulent activities by less than scrupulous remote players wagering online may be advantageously prevented or identified.

A LBCO/OCO can use the systems and methods disclosed herein to convert a typical player tracking card system into a more secure gaming system 104 in a simple and effective method. PTCHs may visit land-based casinos, located around the world, infrequently. With the gaming system 104, PTCHs can advantageously have realistic online casino experience playing free play games, fee-based games, or cash play games.

A LBCO/OCO can use the gaming system 104, as a cost effective means, to market its land-based casinos (LBCs) or OCO websites, by offering its free play and fee-based online games on online casino and social media websites, worldwide. The LBCO/OCO may acquire existing remote players who are existing PTCHs in a cost effective manner. If the LBCO/OCO is located in a gaming jurisdiction or country where cash play online casino games are illegal, the free play games or fee-based games can be quickly converted to legal cash play games when legal cash play games become legal in their respective gaming jurisdictions.

With the systems and methods disclosed herein, legally licensed LBCs operating around the world which may object to legally licensed OCOs offering cash play casino slot machines, casino table games, or sportsbooks may become strong supporters of legalized cash play online casino games. The innovative security aspects of the gaming system 104 can enable OCOs to verify the identities of PTCHs, thus gaining access to the "player rating history" of a large number of PTCHs, which can enable OCO's to protect their assets from highly skilled online players.

With the gaming system 104, remote players can access a LBCO/OCO's online free play games, fee-based tournament games, cash play casino slot machines, table games or sportsbooks. Thus, the LBCO/OCO will not object to legalizing online casino games as the LBCO/OCO may have tens-of-thousands of their PTCHs, wagering on their online casino websites. These PTCHs may rarely, if ever again, physically visit the issuing LBCO after receiving their PTCHs. The gaming system 104 may prevent a LBCO's PTCHs from accessing online casino websites, not associated with the LBCO-OCO issuing a remote player his/her PTC.

In some implementations, a commercial retail website can utilize the gaming system 104 or one or more components of the gaming system 104 such as the biometric data store 208 to verify the identities of remote customers. For example, prior to accepting a payment from a remote customer in the form of a credit card, debit card, or a virtual currency such as Bitcoins, the commercial retail website can utilize the biometric data store 208 to verify the identity of the remote player. The commercial retail website can be a porn website, an online dating website, or an alcoholic beverage website.

Controlling Access to Online Games

Figure 3:
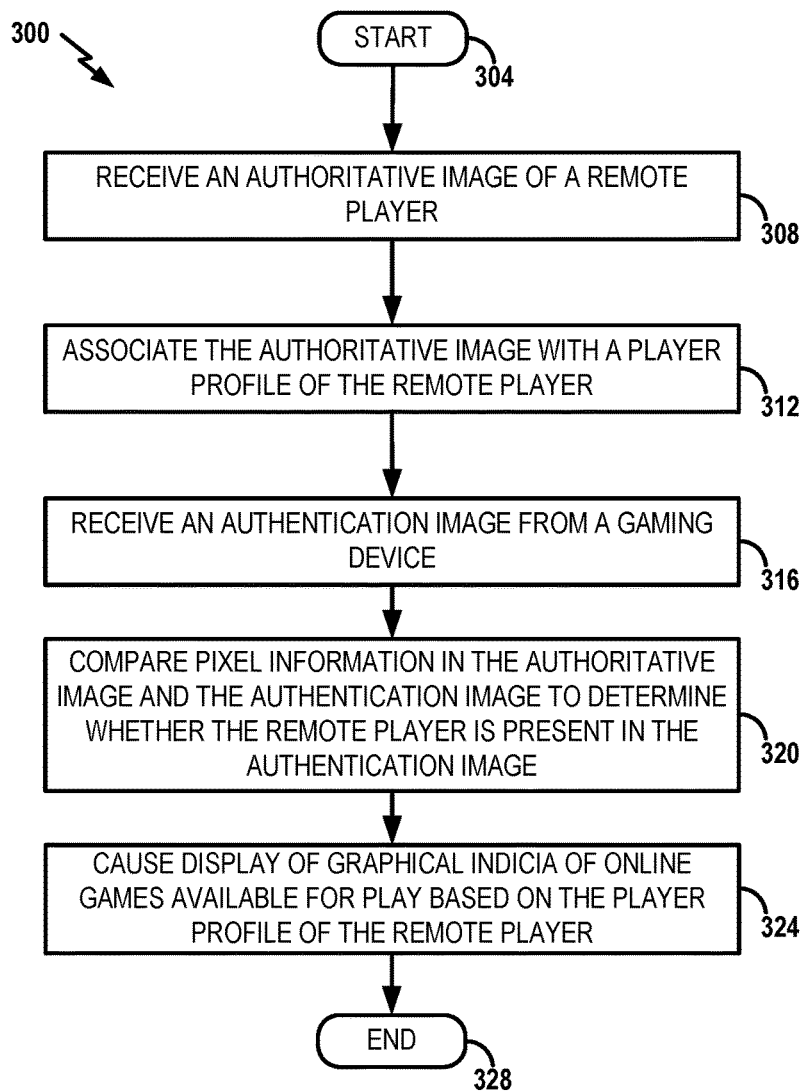
FIG. 3 is a flowchart of an exemplary method for controlling access to online games.

FIG. 3 is a flowchart of an exemplary method 300 for controlling access to online games. The method 300 may be used by the online casino operators, for example the land-based/online operator 108*b*, to control access to online games, for example online casino games. Although the method 300 is described below with respect to the elements of the gaming system 104, those having ordinary skill in the art will appreciate that other components may be used to implement one or more of the steps described herein. The method 300 shown in FIG. 3 may be implemented in whole or in part by one or more of the devices described in this application such as the gaming system 104 shown in FIG. 1.

After starting at start state 304, biometric information, for example such as a frontal image of the remote player's face, is received at process 308. For purposes of describing the method 300 in FIG. 3, image biometric information is used as an example. Additional or other biometric information may be used such as fingerprints, vein prints, palm prints, hand geometry, odour/scent, iris patterns, retina patterns, or voice prints. The biometric information of the remote player may be received to update an existing player profile (described further with reference to FIG. 5) or to create a new player profile (described further with reference to FIG. 6). The biometric information may be included in a message received by the biometric registration interface 228. The receipt of the biometric information may be performed by, for example, the biometric registration interface 228 using an electronic communication protocol such as Transmission Control Protocol/Internet Protocol (TCP/IP). Other electronic communication formats or protocols may be used for receiving the image. In some implementations, the transfer may be secured or encrypted. The biometric registration interface 228 may communicate with a gaming device of the remote player, for example the gaming device 116*a*, through the network 112 to request the biometric information. The remote player's gaming device may display a "casino lobby" requesting the remote player to provide the biometric information.

The biometric information such as an image of the remote player may be identified as an authoritative image of the remote player. The remote player can gain access to an online game by providing an authentication image to the gaming system 104. The remote player may use a gaming device, for example the gaming device 116*a*, to capture the authentication image. The gaming device may include, or be connected to, an imaging device (e.g., a digital camera or a webcam) configured to capture the authentication image. In determining whether to grant or deny the remote player access to the online game, an authoritative image of the remote player can be compared to an authentication image by pixel analysis to determine whether the remote player is present in the authentication image. A number of authoritative images of the remote player can be received, for example 10. In such implementations, the comparing may include comparing the authentication image with all 10 images or a subset of the authoritative images. The determination of how much comparing to perform may be dynamic such as based on the class of game. For example, it may be desirable to ensure the authentication image matches all the images in the authoritative image set for a class of high stakes games while matching one may be sufficient for a different class of games.

The format of the authoritative image of the remote player can be different in different implementations. For example, the authoritative image can be an image of the remote player with width and height of 128 pixels by 128 pixels in the image space. As another example, the authoritative image can be an image of the remote player in a feature space, for example a 128-dimensional real number vector. As yet another example, the authoritative image can be an image of the remote player in the image space, and the method 300 can transform the authoritative image into a vector in a feature space for subsequent steps of the method 300.

At process 312, the authoritative image of the remote player received at process 308 is associated with a player profile of the remote player. The authoritative image of the remote player can be stored in the biometric data store 208 in a native format or an encrypted format to protect the remote player's privacy. The player profile of the remote player can be associated with a number of authoritative images of the remote player, for example 10. The player profile of the remote player can be stored in the player data store 210. The player profile of the remote player can include name, birth date, social security number, passport number or driver's license number. The player profile of the remote player can include information on the remote player's play history such as games played, betting history win/loss percentage, skill level, complimentary value, or redeemable reward points earned.

At process 316, biometric information such as a second image of the remote player can be received. The second image of the remote player can be an authentication image of the remote player received when the remote player attempts to login and/or access an online game hosted by the gaming system 104. The receipt of the biometric information may be performed by the login interface 220 of the gaming system 104. The second image of the remote player can be captured, or caused to be captured, by an imaging device (e.g., a digital camera or a webcam) on or coupled to the gaming device. The imaging device capturing the authoritative image and the imaging device capturing the authentication image may be the same or may be different. Where the biometric information includes non-image information, additional or alternative biometric detectors 118 may be included to capture and provide the biometric information. In some implementations, prior to capturing or causing to be captured of the authentication image, permission of the remote player to access the imaging device to capture the authentication image may be received.

The format of the authentication image may be different in different implementations. For example, the width and height of the authentication image can be the same as the width and height of the authoritative image. As another example, width and height of the authentication image can be different from the width and height of the authoritative image, and the authentication image or the authoritative image can be up-sampled or down-sampled for further analysis. As yet another example, the authentication image can be transformed into a feature space, for example a 128-dimensional real number vector, for subsequent steps of the method 300.

In some implementations, the gaming device for example a desktop computer may only be accessible within an area, for example the remote player's home, and may not be accessible at a public place. Thus, the authentication image should include at least a portion of the area such as the remote player's home. The authoritative image of the remote player can also include at least a portion of the area.

At process 320, biometric information such as pixel information of the authoritative image and the authentication image can by compared to determine whether the remote player is present in the second image. For example, the facial information of the remote player can be extracted from the authoritative image and the authentication image. After extracting the facial information, the presence or absence of the remote player in the authentication image can be determined. The comparison of the biometric information can be performed by the login interface 220. Example implementations of image processing that may be included to compare the authoritative image with the authentication image are described in Zhao et al. "Face Recognition: A Literature Survey," Technical Report CAR-TR-948, Center for Automation Research, University of Maryland (2000), the entirety of which is hereby incorporated by reference.

Figure 4:
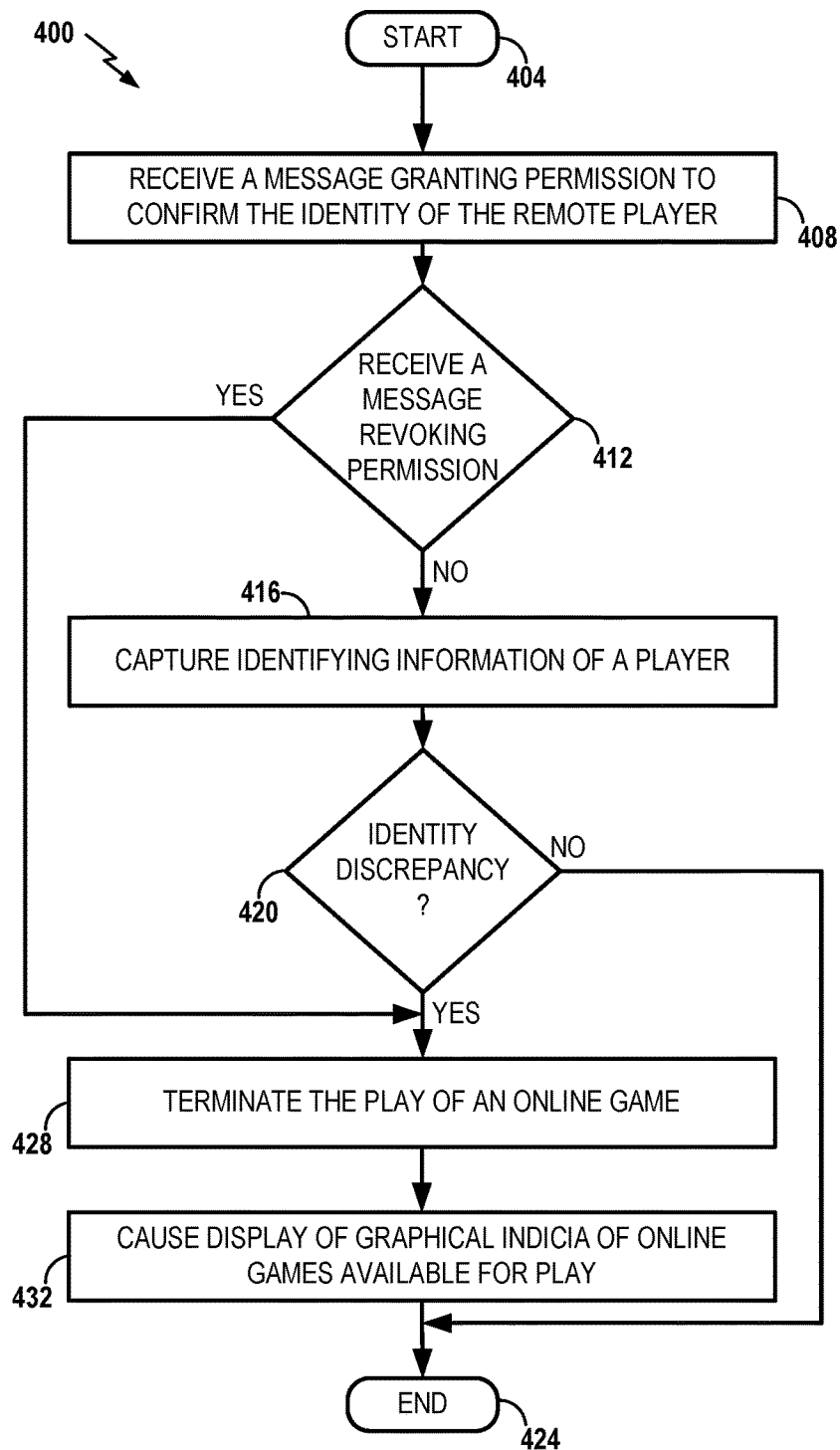
FIG. 4 is a flowchart of an exemplary method for confirming the real-time identity of a remote player.

In one innovative aspect, if the authentication image is determined to be an image of the remote player by, for example, the login interface 220, the authentication image may be associated with the player profile of the remote player and stored in the biometric data store 208 by, for example, the biometric registration interface 228. During a subsequent login by the remote player or when the real-time identity of the remote player is confirmed during a game play (as illustrated in FIG. 4), the authentication image received at process 320 can be treated as an authoritative image of the remote player.

At process 324, graphical indicia of online games such as online casino games available for play by the remote player can be displayed, or caused to be displayed, on a gaming device of the remote player. The graphical indicia of online games can be displayed, or caused to be displayed, in a virtual game lobby. The display or the cause of display of graphical indicia of online games can be performed by the game interface 216. The online game store 212 can store a number of online games. In some implementations, the online game store 212 can store three or more classes of online games, for example free play games, fee-based games, or cash games.

The access controller 224 can identify a set of online games available for play by the remote player based on, for example, the player tracking card number, the player profile of the remote player, or the capability of the gaming device of the remote player. Even though the game interface 216 may be capable of providing the gaming device of the remote player with all games stored in the online game store 212, the access controller 224 can determine that the remote player is only authorized to play a subset of all available online games. For example, the access controller 224 can determine that the remote player is authorized to play only free play games based on the player profile of the remote player. Consequently, the game interface 216 may provide only the online games that the remote player is authorized to play to the gaming device of the remote player. Thus, the gaming device of the remote player may display, or caused to display, graphical indicia of only a subset of all games stored in the online game store 212.

The set of online games available for play by the remote player can be based on whether the remote player gives the gaming system 104 permission to access a biometric detector of, or coupled with, the gaming device of the remote player. For example, the remote player may decline to provide an authentication image. Or the remote player may not allow the gaming system 104 to automatically access an imaging device for capturing an authentication image. Or the remote player may decline to personally turn on an imaging device for capturing an authentication image. In such cases, where the player declines to provide or allow capturing of authentication biometric information, the set of online games available for play by the remote player can be limited (e.g., only free play games).

As another example, the remote player may provide an authentication image. Or the remote player may allow the gaming system 104 to automatically access an imaging device for capturing an authentication image. Or the remote player may agree to personally turn on an imaging device for capturing an authentication image. In such cases, where the player provides or allows capturing of authentication biometric information, the set of online games available for play by the remote player can include more options than the limited set offered in the case of a declining player. For example, the set of games may include one or more of free play games, fee-based online casino tournament games, online casino sportsbooks accepting cash wagers on one or more sporting events or low limit cash play games. As another example, the set of games may include competitive e-games played by professional e-game players that may be seated at separate gaming devices located in close proximity to each other, or in separate geo-physical locations. As yet another example, the set of online games available for play by the remote player can include all the games available in the online game store 212. The method 300 ends at ending state 328.

Real-Time Identity Confirmation

FIG. 4 is a flowchart of an exemplary method 400 for confirming the real-time identity of a remote player. The method 400 may be used by the online casino operators, for example the land-based/online operator 108*b*, to confirm the real-time identity of a remote player during game play. Although the method 400 is described below with respect to the elements of the gaming system 104, those having ordinary skill in the art will appreciate that other components may be used to implement one or more of the steps described herein.

After the identity of a remote player is determined to be present in an authentication image as described with reference to FIG. 3, the method 400 begins at beginning state 404, the entry point of the method 400. At process 408, a message from a remote player is received by, for example, the access controller 224 of the gaming system 104. For example, the access controller 224 can receive the message formatted according to a standardized protocol such as TCP/IP, HTTP, SSL, or FTP from the gaming device 116*a*. Receiving the message may include initiating a communication session with an electronic device of the remote player, receiving one or more electronic transmissions including the message, and decoding the electronic transmissions to re-create the message in a machine readable format for further processing by the access controller 224. Initiating the communication session may include identifying a service level for the communication session and, in some implementations, security features for the communication session (e.g., secure sockets, authorization token, etc.). The message may be received in multiple electronic transmissions. In such implementations, receiving the message may include decoding the individual parts and recombining the pieces to re-create the message, such as based on a sequence identifier included with each part. The message may grant permission by the remote player access to a gaming device, or component included therein, of the remote player to confirm the identity of the remote player. The identity of the remote player may be confirmed during a play of an online game, for example a cash play game.

Prior to receiving the message granting permission by the remote player access to the remote player's gaming device to confirm the identity of the remote player at process 408, the gaming system 104 can inform the remote player that a biometric detector, such as an imaging device, of the remote player's gaming device may be activated to capture biometric information, such as one or more confirmation images, during the play of an online game. A confirmation image can be an image used by the gaming system 104 to confirm the identity of the player during a play of an online game. Accordingly, any remote player wagering online, who does not agree or who revokes his permission to the gaming system 104 to allow the gaming system 104 to activate the biometric detector to collect biometric information for verification of the remote player's identity, may not have access to some or all of the online games hosted by the gaming system 104. The remote player may have to agree to the "Terms and Conditions" prior to his gaming device sending the message granting permission for confirming his identity.

At process 412 after a selection by the player, the method 400 can access the gaming device of the remote player to determine and to confirm the identity of the remote player. A positive message selection at decision state 412 will grant permission to the remote player, for play of an online game and will allow the player gaming access. For example, if the gaming system 104 has received a message revoking permission by the remote player or negative response at process 412, the gaming system 104 can store the message in the player data store 210 or the memory 206 of the gaming system 104. The message revoking permission received from the gaming device of the remote player can be formatted according to a standardized protocol such as TCP/IP, HTTP, SSL, or FTP.

The decision at process 412 can search the player data store 210 to determine the presence of such a message. If the player data store 210 or the memory 206 contains such a message, a message revoking permission by the remote player, during the play of an online game, access to the gaming device to confirm the identity of the remote player has been received. Such a message can revoke permission for all subsequent game plays by the remote player during the particular visit of an online gaming website or all subsequent visits of the online gaming website. If a message revoking permission has not been received, the method 400, proceeds to process 416.

At process 416, the gaming device of the remote player is accessed to capture biometric information of a player, for example a confirmation image, during the play of an online game, such as a cash play game. The confirmation image of a player is an image of the player that can be used to confirm that the remote player, not another player, has been playing the online game. An imaging device (e.g., a digital camera or a webcam) of the remote player's gaming device can capture the confirmation image. The confirmation image may be captured covertly (e.g., without notification of the remote player). Acquiring the biometric information may include identifying a sensor for collecting the desired biometric information, detecting the presence and/or availability of the sensor, transmitting a control message to the sensor to initiate capture of the biometric information, and receiving, in response to the control message, the requested biometric information.

The gaming system 104 may access the gaming device of the remote player to capture biometric information to confirm the identity of the remote player based on a number of factors. For example, the access controller 224 can identify a time t1 to confirm the identity of the remote player. The time identified can be relative to the time t2 the play of the online game begins. The time identified t1 can be based at least in part on the online game being played. The difference between the time identified t1 and the time the play of the online game beings t2 is smaller if the online games involves higher stake. The access controller 224 can initiate a timer for the play of the online game. When the time identified t1 to confirm the identity of the remote player is detected using the timer, the gaming system 104 can access the gaming device of the remote player to capture biometric information of the remote player. In some implementations, the gaming system 104 may access the gaming device of the remote player randomly during a game play. For example, the gaming system 104 may randomly access the imaging device coupled to the remote player's gaming device. The gaming system 104 can use a random number generator or a pseudorandom number generator to determine the random timing for accessing the imaging device coupled to the remote player's gaming device.

As another example, the access controller 224 can determine whether to confirm the identity of the remote player based on the historical game play behavior of the remote player. The historical game play behavior can be stored in the player data store 210. The game play behavior can include pace of play, response time (e.g., for blackjack, the time after a card is dealt and before a decision regarding whether to stand, hit, double, split, or surrender), click rate, typing rate, delays between two game plays, or amount betted. After collecting the game play behavior during the play of the online game and retrieving the historical game play behavior from the player data store 210, the collected game play behavior can be compared to the historical game play behavior of the remote player to determine the existence of a discrepancy. For example, the remote player may be determined to have a skill level of five for the particular online game, a particular type of games, or all games. If the skill level of the play of the online game is determined to be 10, then a discrepancy has been identified. After identifying a discrepancy, the gaming system 104 can access the gaming device of the remote player to capture biometric information of the remote player.

As yet another example, the access controller 224 can determine whether to confirm the identity of the remote player based on prohibited game behavior. In addition to storing the games available for play, the online game store 212 can store the prohibited game play behavior for one or more of the games, for example card counting. The access controller 224 can retrieve prohibited game play behavior for the online game from the online game store 212. After collecting the game play behavior during the play of the online game, the collected game play behavior can be compared to the retrieved prohibited game player behavior. Examples of prohibited game player behavior include card counting, coordinated betting between two or more players, or unexpected or unreasonable win-to-loss ratio. If the collected game play behavior is determined to be consistent with the prohibited game player behavior, the gaming system 104 can access the gaming device of the remote player to capture biometric information of the remote player. Consistency may be measured by comparing the recorded game play behavior of a player to a system configured to detect the prohibited patterns of play such as a card count detection system.

At decision state 420, the existence of a discrepancy between the identity of the player using the gaming device and the remote player is determined. For example, the presence of the remote player in the confirmation image can be used to infer that the remote player has been playing the online game. The presence of the remote player in the confirmation image can be determined by pixel analysis of the confirmation image with the authentication image or the one or more authoritative images of the remote player as described above. The comparison process for decision state 420 may include requesting the authentication image for the remote player using the provided identity information (e.g., username, player tracking card number, etc.). The comparison may then access the confirmation image from a temporary memory location and initiate pixel and/or feature detection for the confirmation image and the authentication image. In some implementations, a discrepancy model may be included that receives a confirmation image and authentication image as inputs and provides, as an output, a discrepancy result. The discrepancy model may be generated through machine learning to identify optimal comparisons between the input images. The machine learning may include neural network training based on known desired discrepancy results for known input images. In some implementations, the discrepancy may be identified based on game play behavior. In such implementations, the model may describe the user's historical game play behavior and, based on game play behavior collected for the remote player, determine whether the collected behavior is consistent with the historical game play behavior. If no discrepancy between the identity of the player using the gaming device and the remote player is determined, the method 400 ends at ending state 424. For example, if the identity of the player confirmed to be the remote player, then no discrepancy has been identified, and the remote player can continue the play of the online game. A discrepancy may be identified when a player other than the remote player, for example a minor, is present in the confirmation image. As another example, if the remote player, an amateur poker player playing an online poker game or tournament, is replaced by a skilled, professional poker player, a discrepancy may be identified at decision state 420. When the remote player signs up for the tournament, he may have agreed that he will be the only person authorized to use his tournament account. The remote player can be disqualified and/or his access to the online game terminated. The gaming system 104 may refuse to pay the disqualified remote player any winning or reimburse the remote player for any losses subject to an appeal by the remote player. The gaming system 104 may include an interface to receive an appeal request and collect further information related to the incident. Such information may be stored for adjudication of the appeal and/or submission to the appropriate government gaming regulatory agency.

At decision state 420, if a discrepancy between the identity of the player using the gaming device and the remote player is determined, the method 400 proceeds to process 428. For example, a discrepancy can occur when an image of a remote player captured during the real-time play of a game does not match an authoritative image of the authorized remote player who initially logged into an online casino website. At process 428, the online game being played is terminated or suspended. The discrepancy identified can be stored in the player data store 210. For example, the player data store 210 may store the time that the discrepancy has occurred in the remote player's player profile. Based on the frequency of discrepancy detection, the gaming system 104 may temporarily or permanently ban the remote player from accessing the gaming system 104. The frequency may be specified via a configuration stored in a memory. The configuration may include a threshold frequency which triggers adjusting the access permissions for a player. Or the gaming system 104 may allow the remote player to play only certain classes of games, for example free play games.

The biometric data store 208 can store the captured biometric information of the player as that of a suspicious person or a person prohibited from accessing the gaming system 104 or an online gaming website hosted by the gaming system 104. For example, a confirmation image can be an image of the player captured during a game play that the gaming system 104 can use to confirm the identity of the remote player. The biometric data store 208 can store the confirmation image as an image of a suspicious person or a person prohibited from playing any game at the online gaming website hosted by the gaming system 104. In some implementations, the remote player's access to the online games hosted or provided by the gaming system 104 may be suspended until the remote player and the operator of the gaming system 104 resolve the identity discrepancy through a dispute resolution process. The gaming system 104 may include an interface to receive information related to the incident. Such information may be stored for adjudication of the dispute. The dispute resolution process may be a process authorized by regulators of online casino games. The gaming system 104 may report the biometric information of the player to the police or a regulator of a LBCO or an OCO.

Other non-limiting examples of causes for terminating or suspending an online game being played include a remote player is replaced by a player unknown, or not approved by, the gaming system 104; the remote player is replaced with a player who is a minor not approved to play the online game being played such as a cash play game; or the remote player playing a fee-based online casino tournament game is replaced by a skilled professional card game player, such as a ringer, known to the gaming system 104.

After terminating the online game being player at process 428, graphical indicia of a modified set of online games available for play may be displayed, or caused to be displayed, on the gaming device of the remote player at process 432. The modified set of online games available for play at process 432 can be different form the set of online games available for play at process 324 of FIG. 3. For example, the modified set of online games available for play at process 432 can include free play games, while the set of online games available for play at process 324 can include free play games, fee-based online casino tournament games, online casino sportsbooks, or cash play games. To generate the modified set of online games available for play at process 432, certain classes of games, such as cash play games, can be removed from the set of online games available for play at process 324. Generating the modified set of online games may include obtaining access definitions for each class of game provided by the gaming system 104. The access definitions may include the permission level granted by the remote player to participate in the class of games. For example, for a free play class of games, it may not be necessary to confirm the remote player's identity while for an online tournament, it may be required to access one or more particular biometric detectors. The access definitions may also include acceptable verification to participate in the class of games. For example, the comparison performed between the confirmation biometric information (e.g., collected or during game play or login) and the authoritative biometric information for the remote player may provide a confidence value indicating how closely the confirmation must resemble the authoritative information. In the case of casual games, it may be desirable for the confidence in the match to be greater than 50% while for more competitive or sensitive transactions, the confidence in the match may be raised to 80% or 90% or even 100%. Games within a class associated with access definitions satisfied by the current remote player's permissions and/or biometrics are then selected for inclusion in the modified set of online games. Causing display of the graphical indicia may include receiving a message of the games to which the remote player has access, selecting the graphical indicia from a memory (e.g., image repository, video repository, or textual descriptor), and transmitting a message to the gaming device of the remote player for presentation. In some implementations, the message may include instructions to initiate and/or configure an application on the gaming device of the remote player to present the graphical indicia. After displaying graphical indicia of the modified set of online games available for play at process 432, the method 400 ends at ending state 424.

At decision state 412, if a message revoking permission has been received, the method 400 proceeds to process 428 to terminate the online game being played. At process 432, graphical indicia of a modified set of online games available for play are displayed, or caused to be displayed, on the gaming device of the remote player at process 432, before the method 400 ends at ending state 424.

Example Player Login

When a remote player attempts to log into a gaming website (e.g., an online casino website) utilizing the gaming system 104, the gaming system 104 can request the remote player to provide an authentication image, for example a frontal facial image of the remote player. The gaming system can activate, or cause the activation, of an authentication controller on the remote player's gaming device. The authentication controller can be configured to authenticate or facilitate authentication of the remote player.

The authentication controller can display an avatar such as a virtual assistant, and the avatar may request the remote player to provide an authentication image. The virtual assistant can display a message such as "Click to Take Photograph" on the remote player's gaming device. The message can cause the remote player to look into the imaging device so that the imaging device can capture an authentication image, for example a flash image, of a frontal view of the remote player.

In some implementations, the display of the avatar may be coordinated with the capture of biometric information. For example, when a remote player accesses an online gaming system, the online gaming system may include a landing interface to welcome the remote player to the system. Such a landing interface may include the avatar. The avatar may virtually interact with the remote player such as asking the remote player to follow the avatar around their screen. While the remote player may not physically move, the motion of the avatar may cause a physical characteristic of the remote player to change. For example, the eyes or nose of the remote player may move to follow the avatar. In some implementations, the avatar may move to a specifically colored or patterned background. All or a portion of these background features may be reflected by the remote player's eyes. Accordingly, collection of the biometric information by the biometric detector, such as a camera, can be coordinated with the interface. When the information is captured, the captured information may be analyzed using the interface state(s). For example, to prevent the use of a still image by the remote player, the eyes of the remote player should move between two images should move. The amount of movement may be detected by comparing two images taken, for example, while the avatar is presented at two different locations. The change in the location of the eyes (or other physical characteristic) may be compared to the change in location of the avatar to confirm that the captured image is of the live remote player and not a still image held up to the camera. As another example, the color or background pattern may be detected in an image capture and compared to the pattern or color of the interface. In some implementations, the system may detect any eye movement by asking (e.g., via the avatar) the remote player to blink. The request to blink may be coordinated with triggering of the biometric detector to collect the biometric information such as an image.

The authentication controller can cause the activation of an imaging device (e.g., a digital camera or a webcam) coupled to the remote player's gaming device. In some implementations, the collection may be performed automatically without receiving direction from the player. In some implementations, the player may be prompted to capture the biometric information. In such implementations, when the remote player clicks on a prompt (e.g., "Click to Take Photograph" message), the authentication controller can cause the imaging device to capture an authentication image.

The authentication controller can be configured to accept or reject the authentication image taken. The authentication controller can be configured to reject an image captured by the imaging device if it does not meet certain image specification. For example, a captured image may be rejected if the image is too dark because of insufficient lighting. If the captured image is rejected, the remote player may be requested to provide another authentication image or, in the auto-collect implementations, another image may be captured. A message such as "Take Photograph Again" can be displayed. If the captured image is accepted by the authentication controller as satisfying the image specification, the authentication controller can provide the authentication image to the access controller 224 of the gaming system 104.

The access controller 224, after pixel analysis of the authentication image with one or more authoritative images of the remote player stored in the biometric data store 208, can confirm the identity of the remote player. Pixel analysis can include searching the biometric data store 208 for an image similar to the authentication image. The biometric data store 208 can store the authentication image as an authoritative image for pixel analysis in a subsequent remote player log in. The access controller 224 can determine the identity of the remote player based on the remote player's email address or Internet Protocol (IP) address. The access controller 224 can determine whether to grant the remote player access based on whether other requirements such as legal requirements including the remote player's age are satisfied.

If the access controller 224 is unable to confirm the remote player's identity by pixel analysis of the first authentication image provided by the remote player, the avatar can prompt the remote player to face and look directly into the imaging device and wait for the gaming device to display an acknowledgment message such as "Thank You! Photograph Taken." The gaming device may display the acknowledgment message after capturing a second authentication image. If pixel analysis of the second authentication image cannot confirm the identity of the remote player, the gaming device can display or announce a denial message such as "Sorry, No Match—Access Denied." The gaming system 104 may store the authentication images provided by the remote player in the biometric data store 208. The authentication images can be marked as images of a suspicious person. In such implementations, the system may evolve the set of images used for detecting suspicious players using the images provided to the system.

After receiving the confirmation from the access controller 224, the authentication controller can notify the remote player's gaming device of successful authentication. The remote player's gaming device can activate a game software application, such as stored in memory on the remote player's gaming device, to allow the remote player to enter an online gaming site, for example an online casino website. The game software application can display, for example, a virtual game lobby showing some or all of the games available for play by the remote player. The availability, as discussed above, may be based on the confirmation from the access controller 224.

Biometric Information Incorporation into Existing Player Profiles

It may be advantageous for a land-based operator 108a or a land-based/online operator 108b, for example an LBCO or a LBCO/OCO, to incorporate biometric information into its existing player tracking card system (PTCS). The PTCS with biometric information incorporated can be the gaming system 104. The player data store 210 of the gaming system 104 can store the player profiles of players in the player tracking card database (PTCD). An OCO or a LBCO/OCO can use the gaming system 104 to verify that a remote player can legally play at an online casino web site operated by the OCO or the LBCO/OCO. The gaming system 104 can advantageously provide more security to protect the assets of the LBCO issuing the PTC or the assets of an OCO or a LBCO/OCO.

Figure 5:
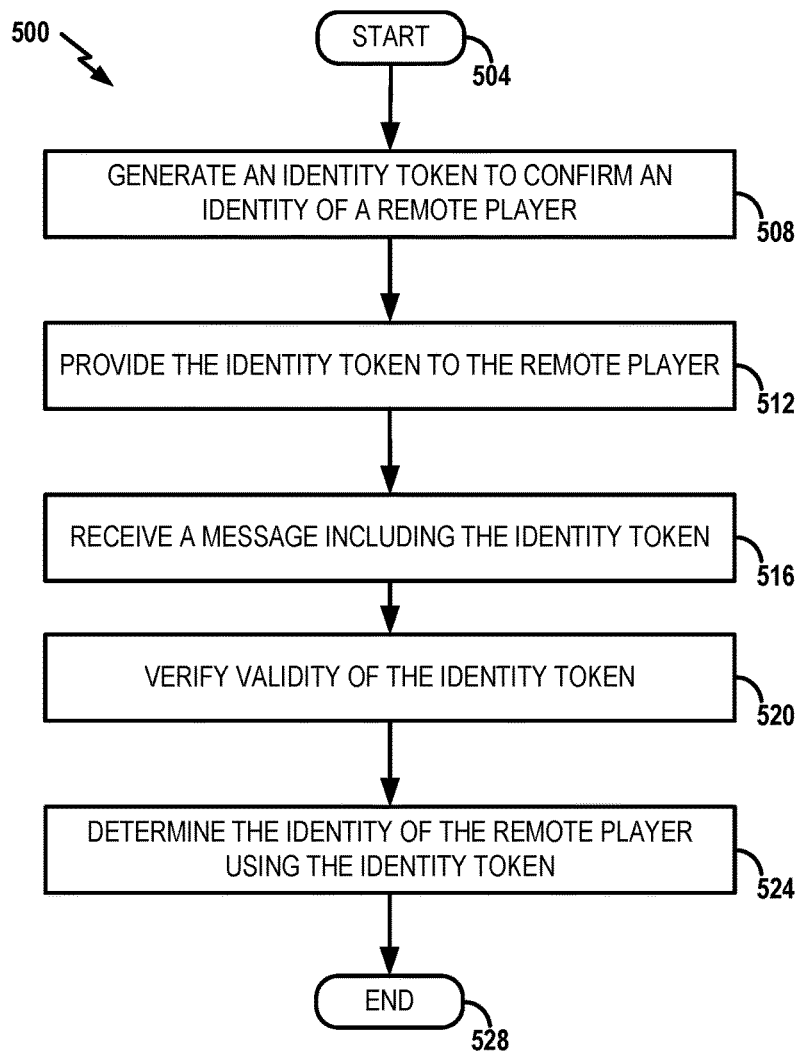
FIG. 5 is a flowchart of an exemplary method for incorporating biometric facial information into player profiles of existing player tracking card holders.

FIG. 5 is a flowchart of an exemplary method 500 for incorporating biometric facial information into player profiles of existing player tracking cards holders (PTCHs). The method 500 may be used by the online casino operators, for example the land-based operator/online operator 108b, to incorporate biometric facial information into player profiles of existing player tracking card holders. Although the method 500 is described below with respect to the elements of the gaming system 104, those having ordinary skill in the art will appreciate that other components may be used to implement one or more of the steps described herein.

After beginning at beginning state 504, an identity token is generated for a remote player who is also an existing player tracking card holder at process 508. The identity token can include the remote player's player tracking card (PTC) number. The identity token can include an alphanumerical string or a quick response (QR) code that the remote player can provide to the biometric registration interface 228, for example, to initiate the process of incorporating biometric information into existing player profiles of player tracking card holders. The identity token can be used to confirm the identity of the remote player. The gaming system 104 can utilize the identity token to prevent unscrupulous actors from pretending to be the remote player. Generating the identity token may include receiving the information to include in the identity token such as the PTC number, name, address, etc. Generating the identity token may also include identifying a combination routine for the received information. The combination routine may identify how the information is combined. The combination routine may identify what the combination output will be (e.g., QR code, graphic, alphanumeric character string, barcode, etc.). With the identified combination routine, the receive information may be processed to generate the combination output. "QR Code Security" by Kieseberg et al. (incorporated by reference in its entirety) describes QR code generation and security features which may be included in whole or in part to generate the identity token. The generated identity token may be stored (e.g., in memory) so as to be compared with a remote player attempting to access the system using the identity token.

At process 512, the identity token is provided to the remote player. For example, an email containing the identity token may be sent to the remote player's email address stored in the remote player's player profile. As another example, a postal mail containing the identity token may be sent to the remote player's mailing address stored in the remote player's player profile. As yet another example, the remote player may request the gaming system 104 to provide him with the identity token. To provide the identity token, the system may select a provisioning system for the remote player such as based on the player profile communication preferences (e.g., mail, email, text message, telephone, fax, etc.). The provisioning system may be an electronic mail server, an automated calling system, a physical mail fulfillment center, a text messaging system, a fax messaging system, or other communication system. Once identified, the token may be transmitted along with contact information for the intended recipient (e.g., remote player). In the case of an automated calling system, the contact information may include the remote player's name and telephone number. In the case of a physical mail fulfillment center, the contact information may include the remote player's name and mailing address. Once received, the provisioning system may transmit a message including the identity token to the remote player.

The identity token can be accompanied with a request for the remote player to provide an authoritative image of the remote player. After receiving the identity token or the request at a computing device associated with the remote player, for example the remote player's gaming device, the identity token or the request can activate a gaming application on the remote player's device. The gaming application can display, or cause the display of, an avatar on the device. The avatar can be a virtual service assistant who can request the remote player to provide image registration. In some implementations, image registration includes receiving an authoritative image from the remote player as described with reference to FIG. 3.

At process 516, a message requesting registration including the identity token can be received at 516. For example, the remote player can use a computing device associated with the remote player, for example the remote player's gaming device, to send the identity token to the biometric registration interface 228. The remote player may have to provide information in addition to the identity token to confirm his identity. Non-limiting examples of the additional information provided by the remote player to confirm his identity include name, address, e-mail address, date of birth, social security number, credit card number, his player tracking card number, and PTC PIN number.

At process 520, the validity of the identity token is verified. The gaming system 104 can keep track of all the identity tokens it has generated to determine if the identity token provided by the remote player is a valid identity token. The identity token can contain security features such as a hash value such that the biometric registration interface 228 can determine the validity of the identity token based on the hash value. The secure hash algorithm (SHA)-2, including any of the SHA-2 hash functions with record digests of 224, 245, 384, or 512 bits can be used (e.g., SHA-256), can be used to generate the hash value.

At process 524, the identity of the remote player is determined using the identity token. The gaming system 104 can associate the identity token sent to the remote player with the remote player's player profile such that the identity of the remote player can be determined without the remote player providing any additional biometric information. The determination may include retrieving the identity token generated at process 508 and comparing the retrieved token with the token included in the message. The comparison may include matching some or all of the token information. In some implementations, the retrieval of the identity token may be based on information included in the message. For example, the message may include a user name which may be associated with a generated token. In some implementations, the identity token included in the message may include identifying information for the remote player. This identifying information may be used to acquire the generated token for comparison with the token received. After the identity of the remote player is confirmed, the biometric registration interface 228 can capture and associate an authoritative image of the remote player with the remote player's player profile as described with reference to FIG. 3. To facilitate the process of obtaining the remote player's biometric information, the gaming system 104 can cause the display of an avatar on the remote player's gaming device. The avatar can request the remote player provide an authoritative image. An authoritative image can be an image of the remote player that can be used in pixel analysis to determine whether the remote player is present in another image, for example an authentication image provided by the remote player for image authentication to log in an online gaming website. Causing display of the avatar may include generating a message to initiate and/or configure an application on the gaming device of the remote player to present the avatar. Some systems may include multiple avatars such as a maitre d', cocktail waiter, bartender, hotel employee, and the like. The message may indicate which avatar to present such as based on the player profile (e.g., demographics, preferences, etc.). Causing display may include initiating a communication session with the gaming device of the remote player and transmitting the message to the gaming device. The gaming device may, in some implementations, initiate an application or hardware, to present the avatar. The presentation may include playback of audio, video, images, or text to via the gaming device or an output device coupled therewith (e.g., display, monitor, console, and the like). The message may include a code or other identifier for the type of biometric information to collect. The code may be used to identify the specific request to present to the remote player (e.g., "Let's take your picture!" or "We need to verify your fingerprint."). Once identified, the message may be presented to simulate an attendant at the gaming venue. Depending on the avatar selected, the message may be presented using different voices (e.g., male or female voice) and/or accents (e.g., if accessing a gaming venue in Australia, the voice may be presented using an Australian accent). The request may include a message to activate the appropriate biometric detector associated with the gaming device of the remote player.

Example Biometric Information Incorporation

The marketing department of a land-based operator 108*a* or a land-based/online operator 108*b* can send an invitation containing an identity token to a player tracking card holder (PTCH) with a player profile without biometric information such as a facial image of the PTCH. The invitation can be in the form of an email or a postal mail. The identity token may be, or include, an invitation number unique for the remote player. The identity token can invite the PTCH to log into an online gaming website, for example a secure online casino website offering free play games. The land-based operator 108*a* or the land-based/online operator 108*b* may own, operate, or be associated with the online gaming website. When the PTCH log into the online gaming website, the PTCH may be given a number of reward points.

The email or the postal mail may instruct the PTCH, when logging into the online gaming website using a web browser, to enter or provide authentication information such as his name, player tracking card number, PTC pin number, or the identity token into the appropriate fields on a registration webpage. After the PTCH completes all the required fields on the registration webpage, he can click an "Enter" button. The PTCH can use a computer device, for example the gaming device 116*a* to access the online gaming website. The PTCH's computing device, for example the gaming device 116*b*, may be coupled to an imaging device (e.g., a digital camera, a webcam, or a closed circuit television (CCTV) camera).

After confirming the identity token and the provided authentication information, the PTCH may be prompted to download a game software application compatible with his computing device, for example a biometric facial recognition software application (BFRSA). The gaming system 104 can cause display of a "Download" button on the PTCH's computing device.

Prior to showing the "Download" button, the PTCH may be informed by a text, graphic, audio, or video message that states that once the game software application is downloaded and installed, the imaging device of the PTCH's computing device may be automatically activated or turned on to capture an image, for example a real-time image, of the PTCH. The gaming system 104 can cause display of Terms and Conditions on the PTCH's computing device. The Terms and Conditions may inform the PTCH that the purpose capturing a real-time image of the PTCH is to associate the captured image with his existing player profile. The PTCH may have to agree to the Terms and Conditions in order to initiate download of the game software application. In some implementations, a commercial website can utilize one or more components of the gaming system 104, for example the biometric data store 208 and the access controller 224, to prevent authorized access of the commercial website.

Once installation of the game software application is complete, the game software application may display a link to an online gaming website which may offer free play games. When the PTCH access the online gaming website, the PTCH's computing device may display a virtual casino lobby to the PTCH acting as a remote player. The game software application can activate or turn on the imaging device coupled to the PTCH's computing device to capture a real-time image of the remote player. In some implementations, the online gaming website can host a number of casino card games that can be played by real-people seated at a real casino card game table located in a legally licensed land based casino (LBC) owned or operated by the land-based operator 108*a* or the land-based/online operator 108*b*.

Issuing New Player Tracking Cards with Biometric Information

The systems and methods disclosed herein can create new player profiles for players, for example new player tracking card holders or remote players, with images such as frontal facial images of the new players. To manage its players, a land-based casino operator (LBCO), for example a legally license LBCO, can operate a player rewards center (PRC) at a land-based casino (LBC) operated by the LBCO. The player rewards center can be located within close proximity to slot machines or casino table games of the LBC. A service assistant working at the player rewards center can operate the gaming system 104 to issue player tracking cards with biometric information to new players.

The LBCO can issue player tracking cards to qualified players. A qualified player may be a player who can legally play the games at the LBCO (e.g., the player may have to be 21 years of age or older). A qualified player can wager on one or more types of slot machines, casino table games, or sportsbooks located on the LBC's premise. To show that he can legally play the games at the LBCO, the qualified player may submit a government issued photograph identification (ID), or documentation (e.g., a state issued driver's license), to the service assistant. The photograph identification can include information such as the player's name, date of birth (DOB), social security number, passport number, gender, address, or country of residence.

After verifying the validity of the photograph identification and that the player can legally play at the LBC, a player profile can be created for the player. The player data store 210 can store the player profile. The player profile can contain the player's information, and the player's information can be inputted into the gaming system 104. For example, the service assistant can manually input the player's information into the gaming system 104 via a new player registration interface 232. As another example, the gaming system 104 can be coupled with an electronic scanner configured for scanning the player's photograph identification. From the scanned photograph identification of the player, the gaming system 104 can extract the player's information using an optical character recognition (OCR) method.

After the player's information is inputted into the gaming system 104, a player tracking card reader (PTCR), for example a magnetic strip reader, connected with the gaming system 104 can create a player tracking card for the player. The player may have to provide a pin number for the newly issued PTC. For example, the player can input a pin number using an electronic keypad coupled to the gaming system 104. The pin number can be stored at the player data store 210.

The gaming system 104 may be coupled to an imaging device (e.g., a digital camera, configured to capture an image of the player (e.g. a frontal facial image of the player). The service assistant can use the imaging device to capture an image of the player. The gaming system 104 can reject an image captured by the imaging device if it does not meet certain image specification. For example, a captured image may be rejected if the image is too dark because of insufficient lighting. If the captured image is rejected, the gaming system 104 may request the player to provide another image. An accepted image can be stored in the biometric data store 208 of the gaming system 104 as an authoritative image that can be used when the player log into an online gaming website operated by the gaming system 104.

Gaming Device for Controlling Access to Online Games

Figure 6:
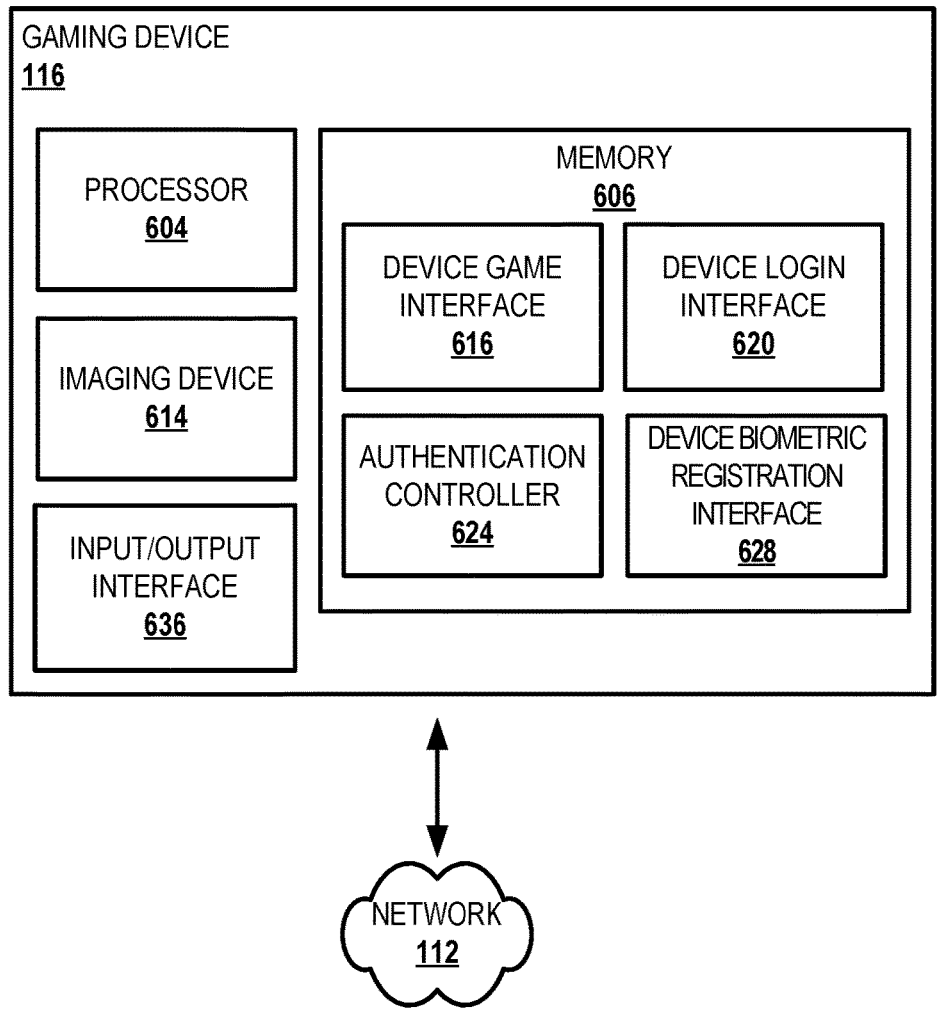
FIG. 6 is a functional block diagram of a gaming device for controlling access of the player to online games.

FIG. 6 is a functional block diagram of a gaming device 116 for controlling access of the player to online games. The gaming device 116 can include a processor 604 coupled to a memory 606 and an imaging device 614 (e.g., a digital camera or a webcam). The memory 606 may include RAM, ROM, and/or other persistent, non-transitory computer readable media. The processor 604 can be configured to execute instructions stored in the memory 606 for implementing a device game interface 616, a device login interface 620, an authentication controller 624, or a device biometric registration interface 628. These interfaces can be part of a game software application being executed on the gaming device 116. In some implementations, the one or more of the device game interface 616, the device login interface 620, the authentication controller 624, or the device biometric registration interface 628 may be implemented as a hardware device (e.g., circuit) configured to perform the functions described. The gaming device 116 can include an input/output interface 636. The processor 604 can communicate output information to an optional display, for example a computer monitor, via the input/output interface 636. The input/output interface 636 can accept input from an optional input device, such as a keyboard, a mouse, a digital pen, a microphone, a storage device, a touch screen, a gamepad, or other input device. One example of an input is a swipe received via a touch screen. Another example of an input is an activation via a mouse click.

One or more components of the gaming device 116, for example the authentication controller 624, can be part of the exemplary system 100 system for controlling access to online games. The gaming device 116 can communicate through the network 112 with online gaming websites hosted by the land-based operator 108a, the land-based/online operator 108b, or the online operator 108c. The gaming device 116 can communicate through the network 112 with the gaming system 104.

The device game interface 616 can be a medium for communicating through the network 112 with the game interface 216 of the gaming system 104. The device game interface 616 can be configured to receive one or more online games or graphical indicia of online games from the game interface 216. The device game interface 616 may display, or cause display of, the received online games or graphical indicia of online games on the gaming device 116. A remote player may configure the graphical indicia of online games displayed on the gaming device 116, such as the look-and-feel of the display or the number of graphical indicia displayed. For example, the gaming device 116, via a computer monitor connected to the input/output interface 636, can display a menu for selecting the maximum number of graphical indicia of online games that can be displayed on the gaming device 116 at once. As another example, the input/output interface 636 of the gaming device 116 can display, or cause display of, a menu on a computer monitor for selecting the size and the color of the graphical indicia. The gaming device 116, via the input/output interface 636 such as a touch screen, can receive a selection from a remote player.

The device login interface 620 can be a medium for communicating through the network 112 with the login interface 220 of the gaming system 104. The device login interface 620 can be a user interface configured to request or accept biometric login information from the remote player to enable the remote player to play an online game offered on an online gaming website, for example an online casino website. The login interface 620 may activate the imaging device 614 to capture an image of the remote player such as an authentication image or a confirmation image. To play the online game, the remote player may provide authentication information to the device login interface 620. The authentication information can include an authentication image, such as a frontal image of the remote player. The authentication information can include the name of the remote player, the remote player's player tracking card number, and/or the PTCH's PIN number. The device login interface 620 can provide the authentication information to the login interface 220 of the gaming system 104.

The authentication controller 624 can be configured to authenticate or facilitate authentication of the remote player. For example, the authentication controller 624 can display an avatar such as a virtual assistant, and the avatar may request the remote player to provide an authentication image. The authentication controller 624 can activate the imaging device 614 to capture an image of the remote player. The authentication controller 624 can accept or reject the authentication image taken. The authentication controller 624 can reject the image captured by the imaging device 614 if it does not meet certain image specifications. For example, a captured image may be rejected if the image is too dark because of insufficient lighting; or if the image is offensive or inappropriate. If the captured image is rejected, the authentication controller 624 may request the remote player to provide another authentication image.

The device biometric registration interface 628 can be a medium for communicating through the network 112 with the biometric registration interface 228 of the gaming system 104. The device biometric registration interface 628 can be a user interface configured to provide the biometric registration interface 228 with biometric information of the remote player for association or incorporation into the remote player's existing player profile. For example, a remote player can be a player tracking card holder (PTCH). To associate an image of the remote player with his player profile, the device biometric registration interface 628 can request the remote player to provide a frontal image for storage in the biometric data store 208 as described with reference to FIGS. 3 and 5. Accordingly, the device biometric registration interface 628 can be used to convert a player tracking card database (PTCD) without any photographs of the player tracking card holders to a PTCD with biometric information of player tracking card holders. The device biometric registration interface 628 can implement, integrate, or utilize one or more biometric facial recognition software applications (BFRSAs). The device biometric registration interface 628 may provide biometric information in different formats to the biometric registration interface 628.

In some implementations, the gaming device 116 can be coupled to a microphone. The imaging device 614 and the microphone can record a real-time play of an online game. The gaming system 104 can broadcast the play of the online game in real-time. The play of the online game can be broadcasted at a later time or can be played on demand. A government gaming regulator may have the authority to impose million dollar fines, or close the land-based casino, if the land-based casino is found to be guilty of manipulating the outcome of any of its casino games. Advantageously, a remote player can have great confidence in the integrity and security of the real-time games broadcasted or shown to the remote player. More people may wager on online casino websites utilizing the gaming system 104. More state, regional, national, or international legislatures may be more susceptible to legalizing online casino cash play games.

The processor 604 may include or be a component of a processing system implemented with one or more processors. The one or more processors may be implemented with any combination of general-purpose microprocessors, microcontrollers, digital signal processors, or any other suitable entities that can perform calculations or other manipulations of information. The processor 604 may be coupled to the memory 606, which may include both read-only memory and random access memory or may provide instructions and data to the processor 604. The processor 604 typically performs logical and arithmetic operations based on program instructions stored within the memory 606. The instructions in the memory 606 may be executable to implement the methods described herein.

The processor 602 may be further configured to communicate with a storage, for example a computer hard drive (HDD) or a solid state drive (SSD). The storage may include various computer components or recording media that retain information. The storage may include a database, cloud data storage service, cluster shared volumes (CSV) arrangement, flat file, or other information storage file or systems. The storage may store information received from the remote players without modification, in a compressed or encoded form, or results of calculations based on the information. The information may also be stored and separated based on how recent the information is.

Figure 7A:
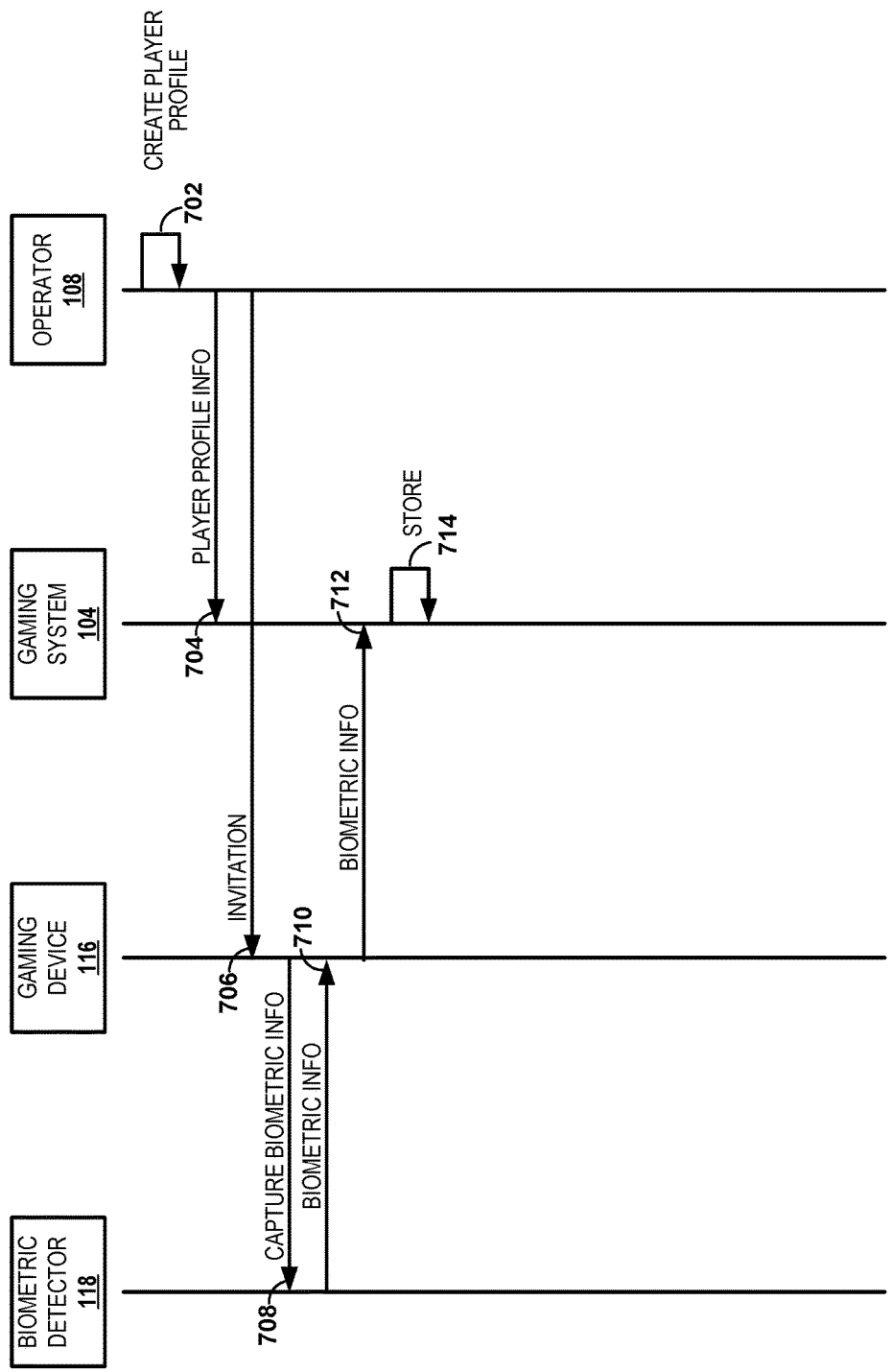
FIGS. 7A-B are a schematic diagrams of messages that may be sent between components of the exemplary system for controlling access to online games shown in FIG. 1.
Figure 7B:
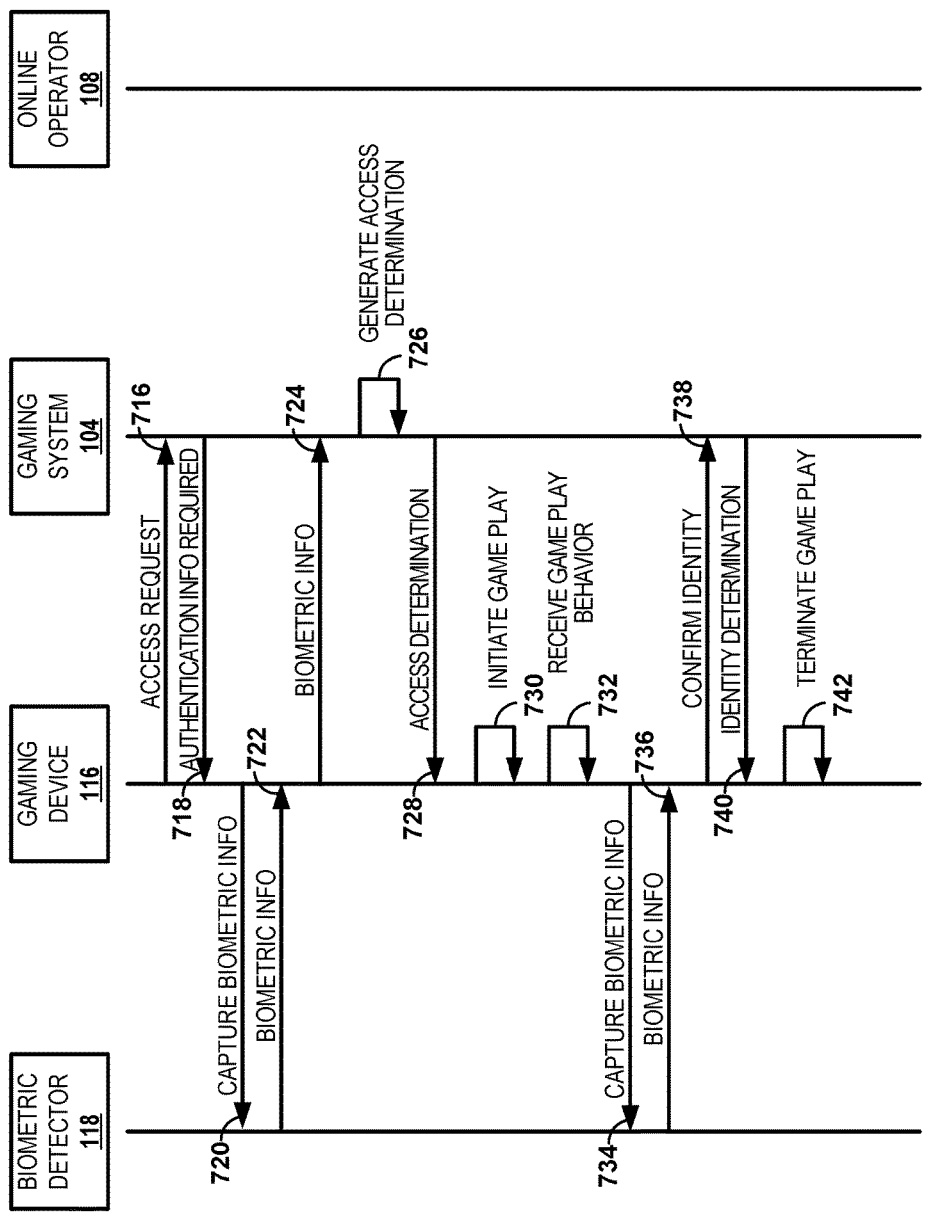

Although a number of separate components are illustrated in FIG. 3, those of skill in the art will recognize that one or more of the components may be combined or commonly implemented. For example, the processor 602 may be used to implement not only the functionality described above with respect to the processor 602, but also to implement the functionality described above with respect to the storage or one or more interfaces. Further, each of the components illustrated in FIG. 6 may be implemented using a plurality of separate elements. Moreover, components or the entirely of the gaming device 116 may be programmed using various programming languages such as C-Sharp, Java, Python, or C++, and in some implementations, via a framework such as Microsoft .NET, Tornado from The Tornado Authors, or The Spring Framework from Pivotal Software Example Access Control to Online Games FIGS. 7A-B is a schematic diagram of messages that may be sent between components of the exemplary system 100 for controlling access to online games shown in FIG. 1. The messages shown in FIGS. 7A-B include messages exchanged between exemplary entities selected to highlight certain features related to controlling access to online games. The messages shown in FIGS. 7A-B illustrate how a gaming system 104 and a gaming device 116 may control access to online games. It will be understood that fewer or additional entities may be included to achieve a similar result.

Referring to FIG. 7A, via a message 702, an operator 108, for example the online operator 108c, can create new player profiles. For example, a land-based casino operated by a land-based casino operator can have a player rewards center. A service assistant working at the player rewards center can create a new player profile for a player and issue a player tracking card. The service assistant can input the new player profile into the gaming system 104 via a message 704. The player profile can be stored in the player data store 210 of the gaming system 104.

The operator 108 can send an invitation containing an identity token to the player via a message 706. As disclosed with reference to FIG. 5, the invitation can be sent via email. The identity token may include an invitation number unique for the remote player. The identity token can invite the player to log into an online gaming website, for example a secure online casino website offering free play games.

Referring to FIG. 7A, when the player logs into the online gaming website, a message 708 instructing a biometric detector 118 to capture biometric information of the player may be transmitted from the device biometric registration interface 628 of the gaming device 116 to the biometric detector 118. The biometric information captured by the biometric detector 118 can include fingerprints, vein prints, palm prints, hand geometry, dour/scent, iris patterns, retina patterns, or voice prints. The biometric detector 118 can be connected to the gaming device 116 directly or through a network such as the network 112. The biometric detector 118 can send a message 710 containing the captured biometric information to the gaming device 116.

The gaming device 116 can send a message 712 containing the captured biometric information to the gaming system 104. The message 712 can include the identity token of the invitation. Accordingly, the gaming system 104 can acquire the biometric information of the player. With the message 712 containing both the captured biometric information and the identity token, the gaming system 104 can confirm the biometric information captured is that of the player. Via a message 714, the gaming system 104 can store the received biometric information as part of the player's player profile. The biometric information can be stored in the biometric data store 208 of the gaming system 104. For example, the biometric information stored in the biometric data store 208 can be an authoritative image of the player and can be used for authenticating the player when the player logs into an online gaming website, for example an online casino, operated by the operator 108. The authoritative image can also be used by the gaming system 104 to confirm the identity of the player during a game play by pixel analysis.

Referring to FIG. 7B, a message 716 requesting access to an online game can be sent by the gaming device 116 to the gaming system 104. For example, when the player visits an online casino website, the device login interface 620 of the gaming device 116 can send the message 716 to the gaming system 104 requesting access to an online game hosted by the online casino website. As disclosed with reference to FIG. 3, via a message 718, the gaming system 104 can request the player to provide biometric authentication. When the message 716 is received by the gaming device 116, the message 716 can cause the gaming device 116 to activate an application on the device (e.g., a browser, a mobile application, etc.) or a component connected thereto. For example, receipt of the user communication may automatically activate an application on the device, such as a biometric information collection application, a standalone application, or a browser, and present an interface to collect the required authentication information. If the device is offline when the message 716 is transmitted, the application may be automatically activated when the device is online.

To capture the player's biometric information, a message 720 instructing the biometric detector 118 to capture biometric information of the player may be transmitted from the authentication controller 624 of the gaming device 116 to the biometric detector 118. The detector 118 can send a message 722 containing the captured biometric information to the gaming device 116.

The gaming device 116 can send the captured biometric information to the gaming system 104 via a message 724. As disclosed with reference to FIG. 3, biometric information such as an image of the remote player can be sent to the gaming system 104 by the gaming device 116. The image of the remote player can be an authentication image of the remote player used to authenticating the player's identity.

Referring to FIG. 7B, via a message 726, the access controller 224 of the gaming system 104 can determine the access level the player should be given. The gaming system 104 can compare the captured biometric information with the authenticated biometric information of the remote player. The gaming system 104 can use such a comparison to determine if the captured biometric information matches the authenticated biometric information of the remote player. For example, as disclosed with reference to FIG. 3, the gaming system 104 can perform pixel analysis of the authoritative image of the player and the authentication image of the player to determine that the player is present in both images. In some implementations, the access controller 224 can perform pixel analysis of the authentication image of the player with images of suspicious players to determine whether the player is a suspicious player. A suspicious player may be denied access to the online games of the online casino website operated by the operator 108. The access level of the player can be, for example, all cash play games and all fee-based games, and not cash play games. The gaming system 104 can send the access level determined to the gaming device 116 via a message 728. In some implementations, the gaming system 104 can send the result of comparing the captured biometric information with authenticated biometric information of the remote player to the gaming device 116 via the message 728.

The device game interface 616 of the gaming device 116 can display graphical indicia of online games available for play by the player based on the access level received from the gaming system 104. For example, graphical indicia of free play games and fee-based games can be displayed on the gaming device 116. After the player selects an online game to play from the graphical indicia of online games available for play, the gaming device 116 can initiate a game play via a message 730.

As disclosed with reference to FIG. 4, during the game play, the gaming device 116 can receive or collect game behavior data via a message 732. Based on the game play data, the authentication controller 624 can determine whether to confirm the identity of the player. The authentication controller 624 can determine whether to confirm the identity of the player based on the historical game play behavior of the player. The game play behavior can include pace of play, response time (e.g., for blackjack, the time after a card is dealt and before a decision regarding whether to stand, hit, double, split, or surrender), click rate, typing rate, delays between two game plays, or amount wagered, wagering decisions, and/or betting strategy skills percentages achieved. After collecting the game play behavior during the play of the online game, the collected game play behavior can be compared to the historical game play behavior of the remote player to determine the existence of a discrepancy. For example, the remote player may be determined to have a skill level of five for the particular online game, a particular type of games, or all games. If the skill level of the play of the online game is determined to be 10, then a discrepancy has been identified.

Referring to FIG. 7B, if a discrepancy is identified, the gaming device 116 can activate the biometric detector 118 to capture biometric information of the player via a message 734. Via a message 736, the gaming device 116 can receive the captured biometric information of the player. The gaming device 116 can request the gaming system 104 to confirm the identity of the player based on the captured biometric information via a message 738. The access controller 224 of the gaming system 104 can compare the player's biometric information stored in the biometric data store 208 and the captured biometric information by, for example pixel analysis. If the identity of the player cannot be confirmed, the gaming system 104 can store the biometric information as that of a suspicious player.

The gaming system 104 can send the gaming device 116 a message 740 indicating whether the identity of the player has been confirmed. For example, if the player playing the online game is the player who has logged into the online casino website, then the identity of the player is confirmed.

If the identity of the player cannot be confirmed, the gaming device 116 can terminate the game play via a message 742. In some implementations, after terminating the game play, the device game interface 616 of the gaming device 116 can display graphical indicia of only free play games to the player.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a gameplay verification system or other hardware included in a gameplay verification system. The gameplay verification system or other hardware included in a gameplay verification system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. For such gameplay verification systems, devices used to implement the system are specially designed to perform the gameplay verification described herein. A gameplay verification system may include electrical circuitry configured to process specific computer-executable software programs or computer instructions to perform one or more of the features described herein. In embodiments where the gameplay verification system includes a FPGA or similar programmable elements, the gameplay verification system may provide one or more of the features described processing without processing computer-executable instructions but instead by configuring the FPGA or similar programmable element to perform the recited features. Although described herein primarily with respect to digital technology, a gameplay verification system may also include primarily analog components. For example, some or all of the gameplay verification processing features described herein may be implemented in analog circuitry or mixed analog and digital circuitry.

The elements of a method, process, routine, or algorithm described in connection with the embodiments disclosed herein can be embodied directly in gameplay verification system hardware, in a software module executed by a device included in the gameplay verification system, or in a combination of the two. A gameplay verification software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the gameplay verification system such that the gameplay verification system can read information from, and write information to, the storage medium. In the alternative, the storage medium can be integral to the gameplay verification system. The gameplay verification system and the storage medium can reside in an ASIC. The ASIC can reside in a device configured to capture or process data such as a microphone, a smartphone, a set-top-box, a tablet computer, a desktop computer, or the like. In the alternative, the gameplay verification system and the storage medium can reside as discrete components (e.g., sub-system) in a device configured to verify gameplay as described herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory computer-readable medium comprising code that, when executed by one or more processors, causes at least one apparatus to perform a process for biometric player tracking for an electronic game to at least:
   store, in a player tracking card database, a profile for a player including an identifier for the profile wherein the identifier uniquely identifies the player;
   receive, from a first gaming device associated with the player, a first message including the identifier associated with the player;
   authenticate the player based at least in part on detecting the identifier within the first message;
   retrieve, from the player tracking card database, the profile for the player using, at least in part, the identifier;
   determine that the profile is not associated with biometric data for the player based at least in part on a comparison of a first value included in a data field in the profile to a second value indicating an absence of biometric data;
   transmit, to the first gaming device, a biometric feature recognition software application configured to control a biometric data collection device based at least in part on a control message received from a communications network;
   receive, from the first gaming device, the biometric data for the player;
   store, in a biometric data store, the biometric data for the player in association with the identifier for the profile, wherein the association includes a third value in the data field in the profile of the player identifying the biometric data in the biometric data store;
   receive, from a second gaming device, a request to play an electronic game, the request including the identifier for the profile;
   determine that the profile is associated with the biometric data, said determining based at least in part on a comparison of the third value included in the data field in the profile to the second value indicating the absence of biometric data;
   access the second gaming device to capture additional biometric data;
   retrieve the biometric data from the biometric data store based at least in part on the identifier for the profile; and
   cause display of the electronic game based on a comparison of the additional biometric data with the biometric data from the biometric data store.

2. The non-transitory computer-readable medium of claim 1, wherein the code that, when executed by one or more processors, causes the at least one apparatus to receive the biometric data for the player and the identifier by:
   validating the identifier included in the first message using at least the profile for the player; and
   accessing the first gaming device to capture the biometric data using the biometric feature recognition software.

3. The non-transitory computer-readable medium of claim 1, wherein the code that, when executed by one or more processors, causes the at least one apparatus to access the second gaming device to capture the additional biometric data by:
   receiving, from the second gaming device, permission to access a biometric detector for capture of the additional biometric data, wherein the capture is based at least in part on the permission.

4. The non-transitory computer-readable medium of claim 1, further comprising code that, when executed by one or more processors, causes the at least one apparatus to perform a process further comprising:
   store, in a game play behavior data store, historical game play behavior of the player;
   collect game play behavior for play of the electronic game, the game play behavior including an interaction by the player with the electronic game;
   detect a discrepancy between the historical game play behavior of the player and the game play behavior for the play of the electronic game by the player;
   upon detecting the discrepancy, transmit a second message to the second gaming device to cause the capture of game-play biometric data during the play of the electronic game;
   receive, from the second gaming device, the game-play biometric data; and alter the electronic game based on a comparison of the game-play biometric data and the biometric data for the player.

5. The non-transitory computer-readable medium of claim 4, wherein the comparison indicates the game-play biometric data does not correspond to the biometric data from the biometric data store, and wherein altering the electronic game comprises at least one of:
terminating the play of the electronic game for the player, adjusting a class of the electronic game for play by the player, or
adjusting a game play limit for the electronic game for play by the player.

6. The non-transitory computer-readable medium of claim 1, wherein the biometric data comprises at least one of: image data, fingerprint data, facial data, vein print data, palm print data, hand geometry data, audio data, retina data, or iris data.

7. The non-transitory computer-readable medium of claim 1, wherein the code that, when executed by one or more processors, causes the at least one apparatus to receive the biometric data by:
causing display, on the first gaming device, of an avatar at a first location;
receiving, from the first gaming device, first biometric data while the avatar is displayed at the first location;
causing display, on the first gaming device, of the avatar at a second location;
receiving, from the first gaming device, second biometric data while the avatar is displayed at the second location;
determining a difference between the first biometric data and the second biometric data corresponds to a difference between the first location and the second location; and
selecting at least one of the first biometric data or the second biometric data as the biometric data for storage.

8. The non-transitory computer-readable medium of claim 7, further comprising code that, when executed by one or more processors, causes the at least one apparatus to perform a process further comprising:
activating a gaming application on the first gaming device to cause display, via the first gaming device, of the avatar.

9. A non-transitory computer-readable medium comprising code that, when executed by one or more processors, causes at least one apparatus to perform a process for biometric user tracking for an electronic service, the process comprising:
storing, in a user database, a profile for a user including an identifier for the profile, wherein the identifier uniquely identifies the user;
receiving, from a first electronic device associated with the user, a first message including the identifier associated with the player;
authenticating the player based at least in part on detecting the identifier within the first message;
retrieve, from the user database, the profile for the player using, at least in part, the identifier;
determining that the profile is not associated with biometric data for the player based at least in part on a comparison of a first value included in a data field in the profile to a second value indicating an absence of biometric data;
transmitting, to the first electronic device, a biometric feature recognition software application configured to control a biometric data collection device based at least in part on a control message received from a communications network;
receiving, from the first electronic device, the biometric data for the player;
storing, in a biometric data store, the biometric data for the user in association with the identifier for the profile, wherein the association includes a third value in the data field in the profile of the player identifying the biometric data in the biometric data store;
receiving, from a second electronic device, a request to access an electronic service, the request including the identifier for the profile;
determining that the profile is associated with the biometric data, said determining based at least in part on a comparison of the third value included in the data field in the profile to the second value indicating the absence of biometric data;
accessing the second electronic device to capture additional biometric data;
retrieving the biometric data from the biometric data store based at least in part on the identifier for the profile; and
causing display of the electronic service based on a comparison of the additional biometric data with the biometric data from the biometric data store.

10. The non-transitory computer-readable medium of claim 9, wherein the code that, when executed by one or more processors, causes the at least one apparatus to receive the biometric data for the user and the identifier by:
receiving, from the first electronic device, a first message including the identifier;
validating the identifier using at least the profile for the user;
accessing the first electronic device to capture the biometric data; and
receiving, from the first electronic device, the biometric data.

11. The non-transitory computer-readable medium of claim 9, wherein the code that, when executed by one or more processors, causes the at least one apparatus to access the second electronic device to capture the additional biometric data by:
receiving, from the second electronic device, permission to access a biometric detector for capture of the additional biometric data, wherein the capture is based at least in part on the permission.

12. The non-transitory computer-readable medium of claim 9, further comprising code that, when executed by one or more processors, causes the at least one apparatus to perform a process further comprising:
storing, in a user behavior data store, historical behavior of the user, the historical behavior identifying past interactions of the user with the electronic service;
monitoring interactions of the user with the electronic service;
detecting a discrepancy between the historical behavior of the user and the interactions;
upon detecting the discrepancy, transmitting a message to the second electronic device to cause the capture of further biometric data;
receiving, from the second electronic device, the further biometric data; and
altering the electronic service based on a comparison of the further biometric data and the biometric data for the user.

13. The non-transitory computer-readable medium of claim 12, wherein the comparison indicates the further biometric data does not correspond to the biometric data from the biometric data store, and wherein altering the electronic service comprises at least one of:
- terminating access to the electronic service by the user,
- adjusting a class of the electronic service accessible by the user, or
- adjusting content accessible by the user through the electronic service.

14. The non-transitory computer-readable medium of claim 9, wherein the biometric data comprises at least one of: image data, fingerprint data, facial data, vein print data, palm print data, hand geometry data, audio data, retina data, or iris data.

15. The non-transitory computer-readable medium of claim 9, wherein the code that, when executed by one or more processors, causes the at least one apparatus to receive the biometric data by:
- causing display, on the first electronic device, of an avatar at a first location;
- receiving, from the first electronic device, first biometric data while the avatar is displayed at the first location;
- causing display, on the first electronic device, of the avatar at a second location;
- receiving, from the first electronic device, second biometric data while the avatar is displayed at the second location;
- determining a difference between the first biometric data and the second biometric data corresponds to a difference between the first location and the second location; and
- selecting at least one of the first biometric data or the second biometric data as the biometric data for storage.

16. The non-transitory computer-readable medium of claim 15, further comprising code that, when executed by one or more processors, causes the at least one apparatus to perform a process further comprising:
- activating an application on the first electronic device to cause display, via the first electronic device, of the avatar.

17. The non-transitory computer-readable medium of claim 9, wherein the electronic service comprises at least one of: a casino gaming system or an age restricted content system.

18. A non-transitory computer-readable medium comprising code that, when executed by one or more processors, causes at least one apparatus to perform a process for biometric player tracking for an electronic game, the process comprising:
- storing, in a biometric data store, authenticated biometric information of players, wherein the players include a remote player;
- storing, in a game play behavior data store, game play behavior of the players, wherein the game play behavior includes behavior of the remote player;
- receiving, from a remote gaming device associated with the remote player, a request to access an electronic game, the request including an identifier associated with the remote player;
- determining that the remote player is associated with authenticated biometric information based at least in part on a comparison of a first value included in a data field in a profile of the remote player to a second value indicating an absence of biometric information, wherein the profile is stored in a player tracking card database;
- transmitting, to the remote gaming device associated with the remote player, a biometric feature recognition software application configured to control a remote sensor based at least in part on a control message received from a communications network;
- receiving first biometric information for the remote player collected by the remote sensor associated with the remote gaming device;
- determining the first biometric information corresponds to authenticated biometric information for the remote player stored in the biometric data store, said determining based at least in part on a comparison between the first biometric information to the authenticated biometric information for the remote player;
- collecting game play behavior for play of the electronic game, the game play behavior including an interaction by the remote player with the electronic game;
- detecting a discrepancy between the behavior of the remote player stored in the game play behavior data store and the game play behavior for the play of the electronic game;
- upon detecting the discrepancy, transmitting a first message to the remote sensor to cause the capture of second biometric information;
- receiving the second biometric information from the remote sensor;
- determining the second biometric information does not correspond to the authenticated biometric information for the remote player, said determining based at least in part on a comparison of the second biometric information to the authenticated biometric information for the remote player; and
- terminating the play of the electronic game for the remote player.

* * * * *